(12) United States Patent
Leon

(10) Patent No.: US 10,341,310 B1
(45) Date of Patent: Jul. 2, 2019

(54) SYSTEM FOR AUTHENTICATING USERS USING MULTIPLE FACTORS

(71) Applicant: ORock Holdings, LLC, Glendale, CA (US)

(72) Inventor: John Leon, Glendale, CA (US)

(73) Assignee: OROCK TECHNOLOGIES, INC., Reston, VA (US)

(*) Notice: Subject to any disclaimer, the term of this patent is extended or adjusted under 35 U.S.C. 154(b) by 206 days.

(21) Appl. No.: 15/376,406

(22) Filed: Dec. 12, 2016

Related U.S. Application Data

(60) Provisional application No. 62/266,442, filed on Dec. 11, 2015.

(51) Int. Cl.
*H04L 29/06* (2006.01)
*G06F 12/14* (2006.01)

(52) U.S. Cl.
CPC ...... *H04L 63/0464* (2013.01); *G06F 12/1408* (2013.01); *H04L 63/061* (2013.01); *H04L 63/083* (2013.01); *G06F 2212/1052* (2013.01)

(58) Field of Classification Search
CPC . H04L 63/0464; H04L 63/061; H04L 63/083; G06F 12/1408
See application file for complete search history.

(56) References Cited

U.S. PATENT DOCUMENTS

| | | | |
|---|---|---|---|
| 8,229,179 B2 | 7/2012 | Sato | |
| 2003/0140235 A1* | 7/2003 | Immega | G06F 21/32 713/186 |
| 2005/0235148 A1* | 10/2005 | Scheidt | G06F 21/31 713/168 |
| 2007/0177769 A1* | 8/2007 | Motoyama | G06F 21/32 382/115 |
| 2008/0065901 A1* | 3/2008 | Takaku | G06F 21/32 713/186 |

(Continued)

FOREIGN PATENT DOCUMENTS

| | | |
|---|---|---|
| CA | 2798626 | 6/2014 |
| EP | 1744264 | 1/2007 |

(Continued)

OTHER PUBLICATIONS

Pearson Vue, State-Of-The-Art Identification, 2008.

(Continued)

*Primary Examiner* — Mohammad A Siddiqi
(74) *Attorney, Agent, or Firm* — Knobbe Martens Olson & Bear LLP

(57) ABSTRACT

A plurality of system nodes coupled via a dedicated private network is described herein. A user can access data stored in one or more system nodes if a multi-factor authentication is successful. The multi-factor authentication can include using the structure of a person's vein (or artery) as one of the factors used to determine whether to authenticate a user. The structure of a person's vein (or artery) can be captured using a vein reader coupled to or embedded within a user device. For example, the vein reader can be coupled to the user's smartphone or can be embedded within the user's smartphone. Once captured, the vein reader can encode the user's vein structure to produce a vein ID that can then be used for authentication purposes.

12 Claims, 19 Drawing Sheets

(56) References Cited

U.S. PATENT DOCUMENTS

2009/0100266 A1* 4/2009 Abe .................. H04L 63/0861
713/175
2014/0196131 A1 7/2014 Lee

FOREIGN PATENT DOCUMENTS

| WO | WO 2012/083456 | 6/2012 |
| WO | WO 2014/092665 | 6/2014 |

OTHER PUBLICATIONS

Sensometrix SA, SensoBox®, The most advanced biometic vein reader, Dec. 2013.
Wang et al., A New Fingerprint Authentication Scheme Based on Secret-Splitting for Enhanced Cloud Security, Recent Application in Biometrics, Dr. Jucheng Yang (Ed.), ISBN: 978-953-307-488-7, InTech, 2001.
Wikipedia, Finger vein recognition, https://en.wikipedia.org/wiki/Finger_vein_recognition, retrieved Nov. 6, 2015.
Hitachi, Ltd., VeinID, Finger Vein Authentication Technology, http://ww.hitachi.eu/veinid/, retrieved Nov. 6, 2015.
Himaga et al., Finger vein authentication technology and financial applications. In: Ratha N.K., Govindaraju V. (eds) Advances in Biometrics. Springer, London, 2008.

* cited by examiner

SYSTEM FOR AUTHENTICATING USERS USING MULTIPLE FACTORS

CROSS-REFERENCE TO RELATED APPLICATIONS

This application claims priority under 35 U.S.C. § 119(e) to U.S. Provisional Patent Application No. 62/266,442, entitled "SYSTEM FOR AUTHENTICATING USERS USING MULTIPLE FACTORS" and filed on Dec. 11, 2015, the entire disclosure of which is hereby incorporated by reference herein.

BACKGROUND

Many electronic devices operated by users have access to or can be accessed via a network. For example, a user can use one electronic device (e.g., a computer) to access another electronic device (e.g., a set-top box) via a network. Typically, usernames and passwords are used to restrict access to network-accessible electronic devices. For example, the data associated with an electronic device may only be accessed if a user provides the correct username and password.

However, usernames and passwords offer little protection against network-based attacks. Users often select simple or common passwords that are easily deciphered by an unauthorized user. Once deciphered, the unauthorized user may have access to sensitive data and can cause physical, emotional, and/or monetary harm.

SUMMARY

One aspect of the disclosure provides a system for authenticating a user comprising an encryption key management system configured to store a plurality of encryption keys. The system further comprises a monitoring server coupled to the encryption key management system, the monitoring server configured with specific computer-executable instructions to: receive a first vein ID and a first key ID from a user device, wherein the first key ID references a first encryption key stored in the encryption key management system; transmit the first key ID to the encryption key management system; receive the first encryption key from the encryption key management system; retrieve an encrypted second vein ID; decrypt the encrypted second vein ID using the first encryption key to generate a decrypted second vein ID; authenticate a user associated with the user device at least partly by determining that the decrypted second vein ID matches the first vein ID; transmit an indication to the encryption key management system that the user is authenticated; receive a second key ID and a second encryption key from the encryption key management system, wherein the second key ID references the second encryption key; re-encrypt the decrypted second vein ID using the second encryption key; and transmit the re-encrypted second key ID to the user device for storage on a storage device.

The system of the preceding paragraph can include any sub-combination of the following features: in combination with the user device, where the user device comprises a camera configured to capture an image of a structure of a vein in an appendage of a user such that the image can be converted into the first vein ID; where the user device is configured to erase the structure of the vein from memory after the user is authenticated; where a vein reader is coupled to the user device, and wherein the vein reader is configured to capture an image of a structure of a vein in an appendage of a user such that the image can be mapped to the first vein ID; where the monitoring server is further configured with specific computer-executable instructions to: receive a username and password combination from a second user device, and authenticate a user associated with the user device at least partly by determining that the decrypted second vein ID matches the first vein ID and that the received username and password combination matches a stored username and password combination; and where the monitoring server is further configured with specific computer-executable instructions to: receive behavioral data captured by the second user device as the user enters the username and password combination, and authenticate a user associated with the user device at least partly by determining that the decrypted second vein ID matches the first vein ID, that the received username and password combination matches the stored username and password combination, and that the received behavioral data matches stored behavioral data.

Another aspect of the disclosure provides a computer-implemented method for authenticating a user. The computer-implemented comprises, as implemented by one or more computing devices configured with specific computer-executable instructions: receiving a first vein ID and a first key ID from a user device, wherein the first key ID references a first encryption key stored in an encryption key management system; transmitting the first key ID to the encryption key management system; receiving the first encryption key from the encryption key management system; retrieving an encrypted second vein ID; decrypting the encrypted second vein ID using the first encryption key to generate a decrypted second vein ID; authenticating a user associated with the user device at least partly by determining that the decrypted second vein ID matches the first vein ID; transmitting an indication to the encryption key management system that the user is authenticated; receiving a second key ID and a second encryption key from the encryption key management system, wherein the second key ID references the second encryption key; re-encrypting the decrypted second vein ID using the second encryption key; and transmitting the re-encrypted second key ID to the user device for storage on a storage device.

The computer-implemented method of the preceding paragraph can include any sub-combination of the following features: in combination with the user device, where the user device comprises a camera configured to capture an image of a structure of a vein in an appendage of a user such that the image can be converted into the first vein ID; where the computer-implemented method further comprises: receive a username and password combination from a second user device, and authenticate a user associated with the user device at least partly by determining that the decrypted second vein ID matches the first vein ID and that the received username and password combination matches a stored username and password combination; and where the computer-implemented method further comprises receive behavioral data captured by the second user device as the user enters the username and password combination, and authenticate a user associated with the user device at least partly by determining that the decrypted second vein ID matches the first vein ID, that the received username and password combination matches the stored username and password combination, and that the received behavioral data matches stored behavioral data.

Another aspect of the disclosure provides a non-transitory, computer-readable storage media comprising computer-executable instructions for authenticating a user, wherein the computer-executable instructions, when executed by a computer system, cause the computer system to: receive a first vein ID and a first key ID from a user device, wherein the first key ID references a first encryption key stored in an encryption key management system; transmit the first key ID to the encryption key management system; receive the first encryption key from the encryption key management system; retrieve an encrypted second vein ID; decrypt the encrypted second vein ID using the first encryption key to generate a decrypted second vein ID; authenticate a user associated with the user device at least partly by determining that the decrypted second vein ID matches the first vein ID; transmit an indication to the encryption key management system that the user is authenticated; receive a second key ID and a second encryption key from the encryption key management system, wherein the second key ID references the second encryption key; re-encrypt the decrypted second vein ID using the second encryption key; and transmit the re-encrypted second key ID to the user device for storage on a storage device.

Another aspect of the disclosure provides a mobile device comprising: a processor; a touch screen; a camera; a light source positioned adjacent to the camera; and memory. The memory is configured to store executable instructions that, when executed by the processor, direct the mobile device to at least: display, on the touch screen, a request for a user to place an appendage at a location above the camera, enable the light source, capture an image of a structure of a vein in the appendage using the camera, and map the captured image to an alphanumerical value.

The mobile device of the preceding paragraph can include any sub-combination of the following features: where the executable instructions further direct the mobile device to at least: identify, using the captured image, a plurality of points along an outline of the structure of the vein, generate a mesh shape by connecting one or more of the plurality of points, and convert the mesh shape into the alphanumerical value based on at least one of a number of unique connections in the mesh shape, a number of sides in the mesh shape, a distance between one or more points in the mesh shape, a width of the mesh shape, a height of the mesh shape, or a length of the mesh shape; where an output of the light source is oriented toward a first direction and a direction in which the camera is oriented to capture the image is in the first direction; where the mobile device further comprises a cover located above the touch screen, wherein the camera and the light source are positioned below the cover and within the touch screen; where touch screen comprises one or more layers, and wherein the one or more layers surround the camera and the light source; where the light source and the camera are positioned on a same side of the mobile device as the touch screen; where the light source and the camera are positioned on a back side of the mobile device and the touch screen is positioned on a front side of the mobile device; where the camera comprises a CCD image sensor; and where the light source comprises a near-infrared LED.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

As discussed above, usernames and passwords provide little protection against network-based attacks. Conventional data network systems offer solutions to secure electronic devices and/or the channel by which electronic devices communicate over a network from unwanted intrusions, but such solutions leave gaps that can be exploited by unauthorized users. Thus, a system that offers end-to-end protection against network-based attacks may be desirable. This may be especially true given the proliferation of network-accessible data storage systems, where valuable information is stored and accessed via a network, and/or network-accessible electronic devices.

Accordingly, a multi-node environment is described herein in which a plurality of nodes coupled via a dedicated private network offer an end-to-end solution for protecting against network-based attacks. For example, a single node can receive and store user data via a data flow that passes through various components of the node. The node can be designed such that communications internal to the node, such as the transmission of encryption keys, are partitioned or walled off from the components of the node that handle the publicly accessible data flow. The node also includes a key management subsystem to facilitate the use of encryption keys to encrypt user data.

Multi-Node Architecture Overview

Figure 1:
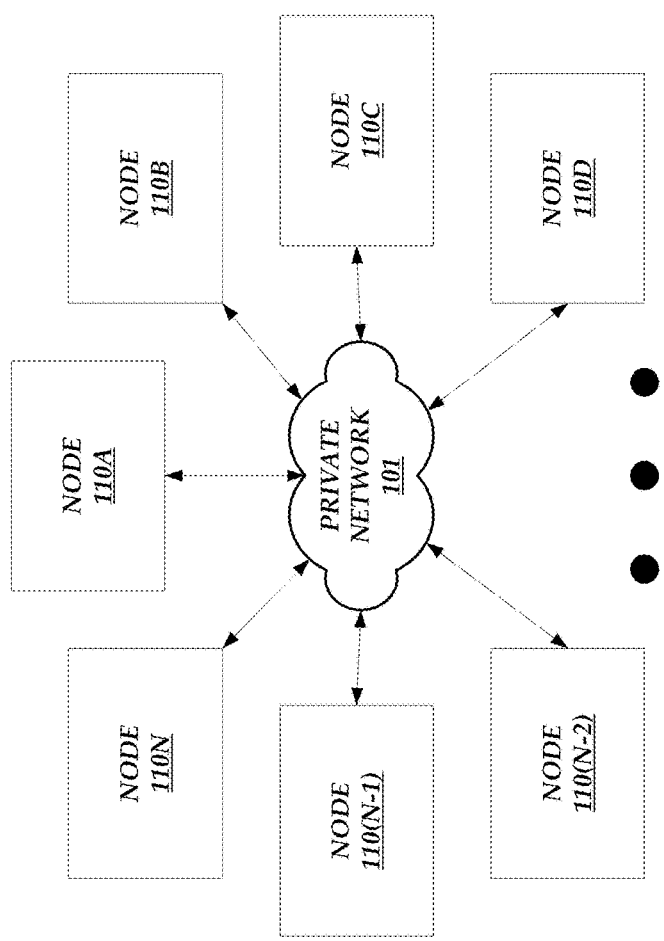
FIG. 1 illustrates a multi-node environment.

FIG. 1 illustrates a multi-node environment. As shown in FIG. 1, the multi-node environment includes a plurality of nodes 110A-N that communicate with each other via a dedicated private network 101. Each node 110A-N can be a system that includes a variety of electronic devices and/or components, as described in greater detail below with respect to FIGS. 2A-6. The nodes 110A-N can be configured to control user devices, detect inconsistencies in the operation of one or more user devices, store user data, and/or protect stored user data from network-based attacks.

The private network 101 can be a privately accessible network of linked networks, possibly operated by various distinct parties, such as a personal area network, local area network, wide area network, cable network, satellite network, cellular telephone network, etc. or combination thereof, each with access to and/or from the Internet. The private network 101 can provide superior network performance through dedicated bandwidth and low latency as compared to other publicly available networks, such as the Internet. For example, the private network 101 can provide a direct connection between the various nodes 110A-N in the multi-node environment, where the communication channel providing the direct connection cannot be accessed by electronic devices that are configured to access a publicly available network. Because access to the private network 101 is restricted to just the nodes 110A-N, the risk of a network-based intrusion of the nodes 110A-N or the data transmitted between the nodes 110A-N is greatly diminished.

In some embodiments, as discussed below, the nodes 110A-N also have access to publicly accessible networks, such as the Internet. Each node 110A-N can include an access server and/or router that enforces a separation between the publicly accessible network and the private network 101.

Each node 110A-N can be located in a different geographic location. For example, the node 110A can be located in a first country (e.g., the United States of America), the node 110B can be located in a second country (e.g., the United Kingdom), and so on. Alternatively, each node 110A-N may reside at a common geographic location.

In an embodiment, each node 110A-N is identical in composition and operation. The nodes 110A-N can operate in real-time to replicate data between or among the various nodes 110A-N to ensure that the sum of aggregate data is present in both or all node 110A-N locations. This redundancy not only improves the reliability of the multi-node environment, but also enhances the threat-detecting capability of the nodes 110A-N. For example, the nodes 110A-N may independently identify Internet Protocol (IP) addresses from which one or more attacks on the respective node 110A-N (e.g., to disable or impair the functionality of the respective node 110A-N) or attempted intrusions into the respective node 110A-N have originated. A node, such as the node 110A, may transmit a routing table that includes the IP addresses that the node 110A has identified as a threat to one or more of the other nodes 110B-N so that the other nodes 110B-N can update their routing tables accordingly. Thus, by sharing routing tables between nodes 110A-N, an address identified as a threat at one node can be blocked by the other nodes in the environment.

The similarity in architecture between various nodes 110A-N may enable any node 110A-N to serve as the secondary storage and/or processing site for any other node 110A-N. Thus, a multi-node environment that includes identically constructed nodes 110A-N may have a built-in secondary storage site to permit the storage and/or recovery of information. In other words, the nodes 110A-N may be redundant. The actual pairing of primary and secondary storage sites may be determined by taking into account a variety of factors, such as regional legal requirements, latency, and/or the like. The secondary storage site can have information security safeguards equivalent to or nearly equivalent to those of the primary site and can maintain connectivity to the primary site. Such a multi-node environment may also include an inherent secondary processing site to permit the resumption of system operations when primary processing capabilities become unavailable. The secondary processing site can have information security safeguards equivalent to or nearly equivalent to those of the primary site. The redundancy of the nodes 110A-N is described in greater detail below with respect to FIGS. 2A-B and 6.

In other embodiments, the nodes 110A-N are not identical in composition and/or operation. For example, the nodes 110A-N may include additional components required by the jurisdiction in which the respective node 110A-N resides to comply with one or more security standards (or may not include components that cannot be included in the respective node 110A-N in order to comply with one or more security standards).

Node Composition

Figure 2A:
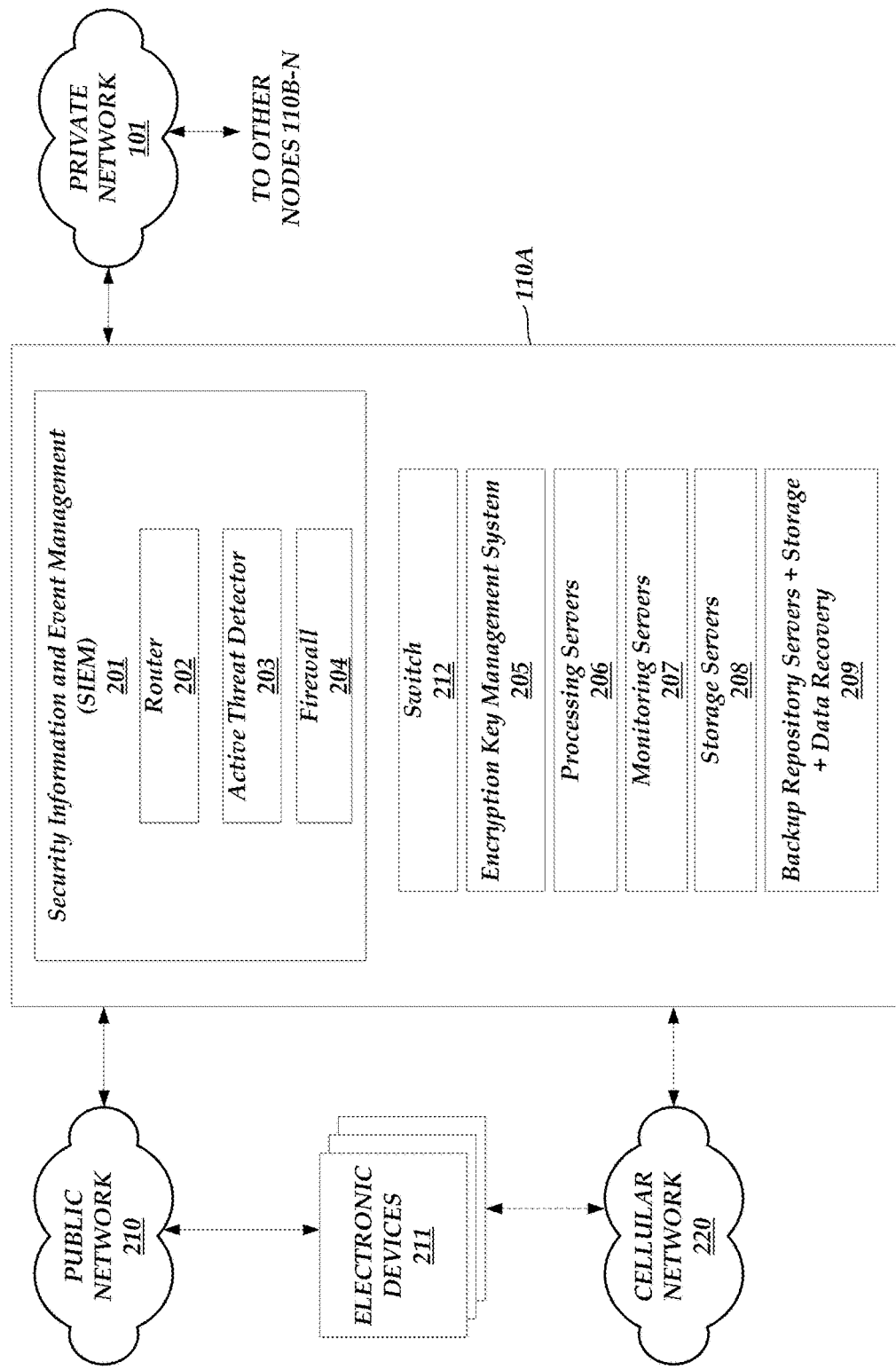
FIG. 2A-2B illustrate the components of an exemplary node in the multi-node environment of FIG. 1.
Figure 2B:
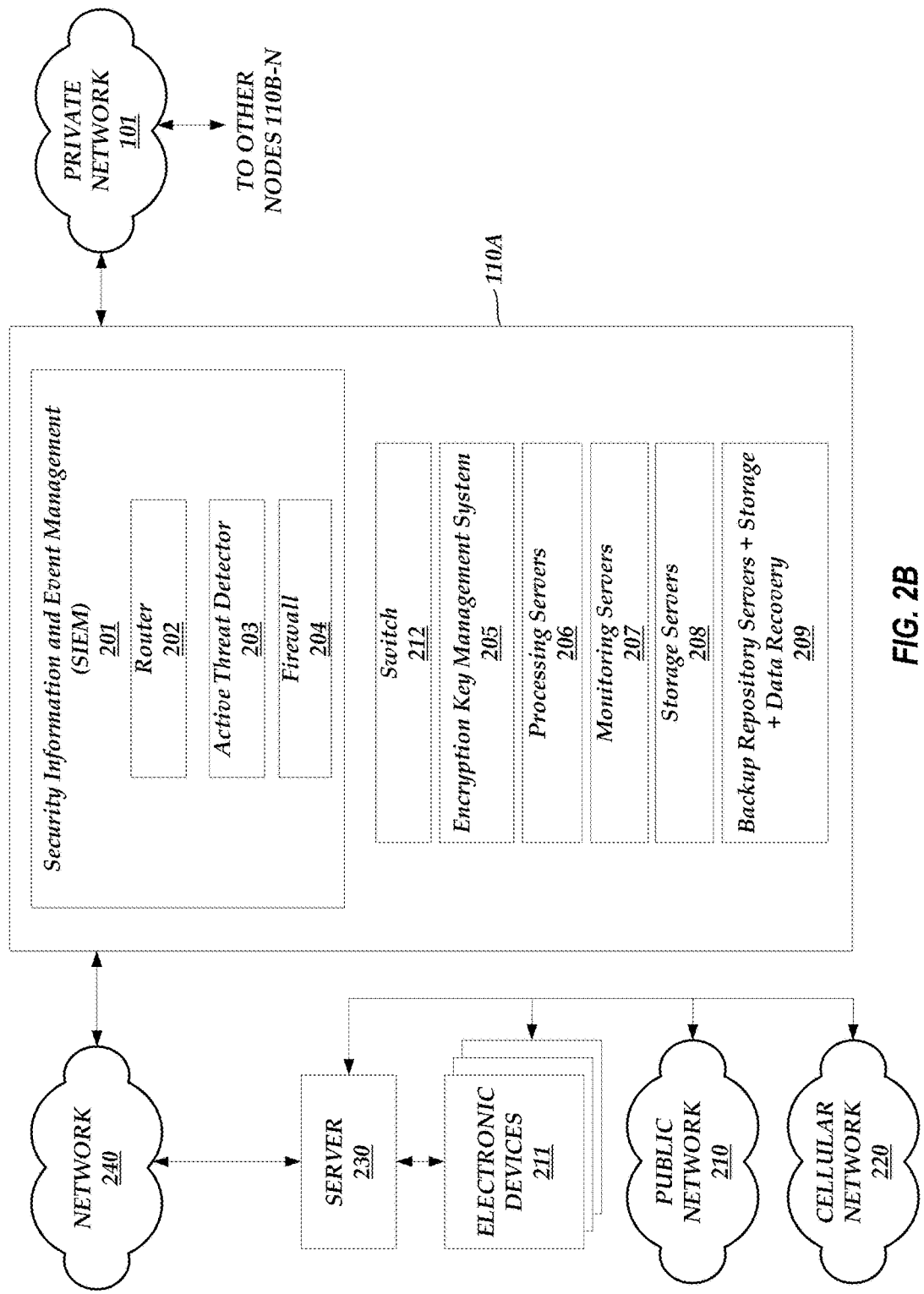

FIGS. 2A-2B illustrate the components of an exemplary node 110A in the multi-node environment of FIG. 1. Any of a variety of alternate node architectures may alternatively be used for some or all of the nodes 110A-N. Alternatively or in addition, the architecture of the node 110A can be similar to the architecture of the nodes 110B-N and/or the operations performed by the node 110A can also be performed by the nodes 110B-N. As shown in FIGS. 2A-B, the node 110A can include a security information and event management (SIEM) system 201, a switch 212 (e.g., a CISCO CATALYST 3650 Series switch, a CISCO CATALYST 4500 Series switch, etc.), an encryption key management system 205 (e.g., two HP Enterprise Secure Key Managers), one or more processing servers 206 (e.g., ten HP DL380 servers), one or more monitoring servers 207 (e.g., two HP DL380 servers), one or more storage servers 208 (e.g., an HP 3PAR STORESERV system), and one or more backup repository servers 209 (e.g., an HP 3PAR STORESERV system). The SIEM system 201 can include a router 202 (e.g., a CISCO ASR Boundary Device), an active threat detector 203 (e.g., a RAYTHEON SUREVIEW Threat Detector), and a firewall 204 (e.g., a FORTINET firewall, a PALO ALTO NETWORKS 5000 Series firewall, etc.). Some or all of the components of the node 110A can reside at a common geographic location and may be interconnected on a local area network.

The SIEM 201 may provide boundary security. Within the SIEM 201, individual intrusion detection tools can be integrated into a system-wide intrusion detection sub-system. The router 202 can interface with the external world and transfer data between the node 110A and the external world. For example, the router 202 can transfer data between the node 110A and other nodes 110B-110N via the private network 101. As illustrated in FIG. 2A, the router 202 can also transfer data between the node 110A and electronic devices 211 via a public network 210 (e.g., a publicly accessible network of linked networks, such as the Internet) and/or a cellular network 220 (e.g., a private network operated by a cellular carrier or operator). Alternatively or in addition, as illustrated in FIG. 2B, the router 202 can transfer data between the node 110A and a server 230 via a network 240 (e.g., a public and/or private network similar to the public network 210, the cellular network 220, and/or the private network 101). The server 230 can be a computing system that manages one or more of the electronic devices 211 and that communicates with the electronic devices 211 via the public network 210 and/or the cellular network 220. Alternatively or in addition, the server 230 can communicate with the electronic devices 211 via a private network, such as a local area network (not shown). The node 110A can communicate with electronic devices 211 via the server 230. Here, because the node 110A communicates with the server 230 via the network 240 (which can be a private network)

and the communication channel is encrypted and secure due to the security techniques implemented by the node 110A, any unauthorized users would not detect and cannot interfere with instructions transmitted by the node 110A to the server 230. In the situation that the network 240 is a private network, unauthorized users would not even have the ability to access the network 240. Thus, the node 110A can communicate securely with the server 230 without the unauthorized user having the ability to reject, prevent, and/or manipulate the communication.

The active threat detector 203 can monitor network activities and/or detect abnormal events and/or abnormal patterns of activities. The active threat detector 203 may receive third party threat data from external sources (e.g., via the public network 210) to enhance the monitoring and detection functionality. For example, the active threat detector 203 may periodically receive updated lists or ranges of Internet Protocol (IP) addresses that have been identified as suspicious or from which malicious activity has originated (e.g., by malware analysis software). The lists may be in the form of a routing table (e.g., an internal address resolution protocol (ARP) routing table) that the active threat detector 203 can use to compare with the source and/or destination address of incoming packets. The active threat detector 203 can be automatically updated each time the third party threat data is received from external sources. Alternatively, the active threat detector 203 can be updated once the received third party threat data is approved for use by an administrator. In an embodiment, the nodes 110A-N can share such received third party threat data via the private network 101. Thus, if access to the external sources is severed for one node 110A-N, that node 110A-N can receive the third party threat data from another node 110A-N instead.

The firewall 204 can control network activities and/or work in tandem with real-time threat detection performed by the active threat detector 203. Like with the active threat detector 203, the firewall 204 can also receive third party threat data from external sources (e.g., via the public network 210) to enhance the control of network activities. The third party threat data may be received from the same external sources as the active threat detector 203 or from different external sources. The third party threat data may be in the form of routing tables and/or lists or ranges of suspicious or malicious IP addresses and may be used in the same manner as the active threat detector 203 as described above. The third party threat data can also be shared between the nodes 110A-N via the private network 101.

In an embodiment, the SIEM 201 components 202-204 correlate information to provide a more robust security scheme. For example, the STEM 201 uses information generated by the router 202, the active threat detector 203, and/or the firewall 204 to protect data from unauthorized access, modification, and/or deletion. If one of the active threat detector 203 or the firewall 204 identifies malicious activity that originates from an IP address that otherwise was not identified in the data received from the external sources, the active threat detector 203 and/or the firewall 204 flags the IP address as a malicious address. The active threat detector 203 and/or the firewall 204 may then notify the other nodes 110A-N (via the router 202) of this newly identified IP address so that the other nodes 110A-N can be prepared to block and/or analyze a packet that originates from or is destined for the newly identified IP address. In this way, if one node 110A identifies a threat, the other nodes 110B-N can be automatically updated to recognize and prepare for the same threat.

Thus, the STEM 201 can support both external threat detection (e.g., using third party threat data) and internal threat detection (e.g., threats identified by a node 110A-N). Both the third party threat data and the threat data identified by a single node 110A-N can be shared with the other nodes 110A-N via the private network 101 (e.g., as routing tables or updates to routing tables) such that the routers 202, the active threat detectors 203, and/or the firewalls 204 of each of the nodes 110A-N are configured with the same, updated threat information.

The STEM 201 can support a dedicated connection within the multi-node environment to maintain a separate network within the multi-node environment (e.g., as represented by the private network 101). The separate network (e.g., the private network 101) can be dedicated to a single user or entity to implement the particular technical requirements desired by the user or entity. In an embodiment, the STEM 201 uses Border Gateway Protocol (BGP) to switch and/or route traffic across the private network 101, the public network 210, and/or other private or public networks not shown (e.g., dedicated network connections, such as tunneled connections, to an enterprise network).

The one or more processing servers 206 can execute applications, virtual machines, and/or the like that are requested by users attempting to access the node 110A. The one or more processing servers 206 can also perform analytics on user data. For example, the one or more processing servers 206 can track historical data, scheduling data, and/or the like and provide statistical information derived from such data. The one or more processing servers 206 can derive this information in real-time (e.g., as the data is received and processed by the node 110A) or on-demand (e.g., when requested by a user) to allow a user to review events that have already occurred. Alternatively, another server (not shown) within the node 110A can track historical data, scheduling data, and/or the like and provide statistical information derived from such data.

The one or more monitoring servers 207 can be configured to monitor the one or more processing servers 206 to ensure that the applications executed by the one or more processing servers 206 are running properly. The one or more monitoring servers 207 can start, restart, stop, and/or pause any applications executed by the one or more processing servers 206 for diagnostic purposes. The one or more monitoring servers 207 may also control and monitor the power, cooling, and/or other environmental elements of the node 110A. The one or more monitoring servers 207 may also perform authentication monitoring to ensure that users are only provided access to the node 110A after being successfully authenticated (e.g., the one or more monitoring servers 207 can include or act as a lightweight directory access protocol (LDAP) server).

The one or more storage servers 208 can include one or more self-encrypting drives (SEDs) that are each non-transitory storage mediums (e.g., magnetic disk drives, solid state memory drives, etc.) configured to encrypt and store received data using encryption keys provided by another component (e.g., the encryption key management system 205 in this case).

In some embodiments, the one or more backup repository servers 209 are configured to store data backups and to perform disaster recovery (e.g., data recovery) operations. In other embodiments, the one or more backup repository servers 209 are only configured to store data backups. The one or more backup repository servers 209 can store backups of data associated with the SIEM 201, the switch 212, the encryption key management system 205, the one or more processing servers 206, the one or more monitoring servers 207, and/or the one or more storage servers 208.

In an embodiment, the one or more backup repository servers 209 of one node, such as node 110A, stores data backups of data associated with another node, such as node 110B. Likewise, the one or more backup repository servers 209 of the node 110B stores data backups of data associated with the node 110A. Thus, the data backup stored in one node is a mirror of the data of another node (and allows the node with the stored data backup to act as a redundant node). A circuit, such as a virtual circuit (not shown) can monitor the status of each of the nodes 110A-N. If a first node becomes inactive, the circuit notifies a second node that stores the data backup of the inactive first node and the second node temporarily operates as the first node (and the second node). Thus, if the node 110A becomes inactive, the one or more backup repository servers 209 of the node 110B operate as the node 110A, providing the functionality that the node 110A normally would provide.

While the backup node operates as the inactive node, the backup node may store data, change settings, and/or make other changes that have not been introduced in the inactive node. Before the inactive node becomes fully active and starts operating as normal, the backup node and the inactive node may be synched. For example, once the inactive node becomes active again, the circuit notifies the backup node, the backup node updates the inactive node to include any changes that occurred since the inactive node became inactive, and the inactive node begins operating under normal conditions again. Thus, if the node 110A becomes active again, the one or more backup repository servers 209 of the node 110B updates any or all components of the node 110A such that the node 110A and the data in the one or more backup repository servers 209 associated with the node 110A are synched, and the node 110A then begins normal operations (and the one or more backup repository servers 209 of the node 110B cease operating as the node 110A and merely provide backup services as before).

In alternate embodiments, the one or more backup repository servers 209 of a node store data backups of data associated with that same node. If the node becomes inactive, the one or more backup repository servers 209 of the node may operate as described above to provide services until the node becomes active again.

In an embodiment, a node, such as the node 110A, includes components to separate user functionality (including user interface services) from system management functionality. For example, a multi-node environment may utilize sub-networks for publicly accessible system components and logically separate those components from system-internal networks and/or functions. A node can also include components to prevent unauthorized and/or unintended information from being transferred through shared multi-node environment resources. A node can include components to partition stored information into various components residing in separate physical domains or environments. In some embodiments, in addition to the physical separation of stored information, the multi-node environment maintains a separate execution domain for each executing process running in the nodes 110A-N of the multi-node environment.

Each node 110A-N may be a single computing device or may include multiple distinct computing devices, such as computer servers, logically or physically grouped together to collectively operate as a system. The components of each node 110A-N can each be implemented in application-specific hardware (e.g., a server computing device with one or more ASICs) such that no software is necessary, or as a combination of hardware and software. In addition, the modules and components of each node 110A-N can be combined on one server computing device or separated individually or into groups on several server computing devices. In some embodiments, each node 110A-N may include additional or fewer components than illustrated in FIGS. 2A-2B.

In some embodiments, the features and services provided by each node 110A-N may be implemented as web services consumable via the public network 210 and/or the cellular network 220. In further embodiments, each node 110A-N is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Each electronic or user device 211 can be an Internet of Things (IoT) device. As used herein, an IoT device can be any electronic device that can collect and/or exchange data via a network and/or that can be sensed or controlled remotely via a network. For example, an IoT device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, home automation devices (e.g., "smart thermostats" or "smart meters"), sensors (e.g., sensors that measure physical data like voltage, current, pressure, temperature, soil acidity, heart rate, blood pressure, etc.), transportation vehicles (e.g., automobiles, train cars, airplanes, helicopters, bicycles, motorcycles, ships, etc.), robots, digital signs, automated teller machines, set-top boxes, gaming consoles, entertainment systems, televisions with network access and program execution capabilities (e.g., "smart TVs"), and various other electronic devices and appliances. Individual IoT devices may execute a browser application to communicate via the public network 210 and/or the cellular network 220 with other computing systems, such as the node 110A or the other nodes 110B-110N, in order to transmit and/or receive data (e.g., settings or device parameter information) and/or in order to be sensed or controlled remotely. Alternatively, an electronic device 211 can be a device other than an IoT device (e.g., a device that does not collect or exchange data and/or that is not sensed or controlled remotely via a network, such as a non-network-enabled device).

As described herein, a user can access one or more nodes 110A-N via a user device (e.g., a computing device, like an electronic device 211 or a non-IoT device, that is or is not being monitored by the nodes 110A-N). For example, the nodes 110A-N may be located so that they are close (in either a geographical or networking sense) to groups of user devices. In such a configuration, a user device may be provided access to the node 110A-N to which it is closest and/or to the node 110A-N that shares a geographic region with the user device, rather than all user devices being provided access to a single node 110A-N. If the node 110A-N to which a user device is closest and/or to that shares a geographic region with the user device is offline (e.g., due to an outage, maintenance, etc.), then the user device may be provided access to the next closest node 110A-N, the node 110A-N assigned to be a backup of the offline node, and/or the like.

Figure 3A:
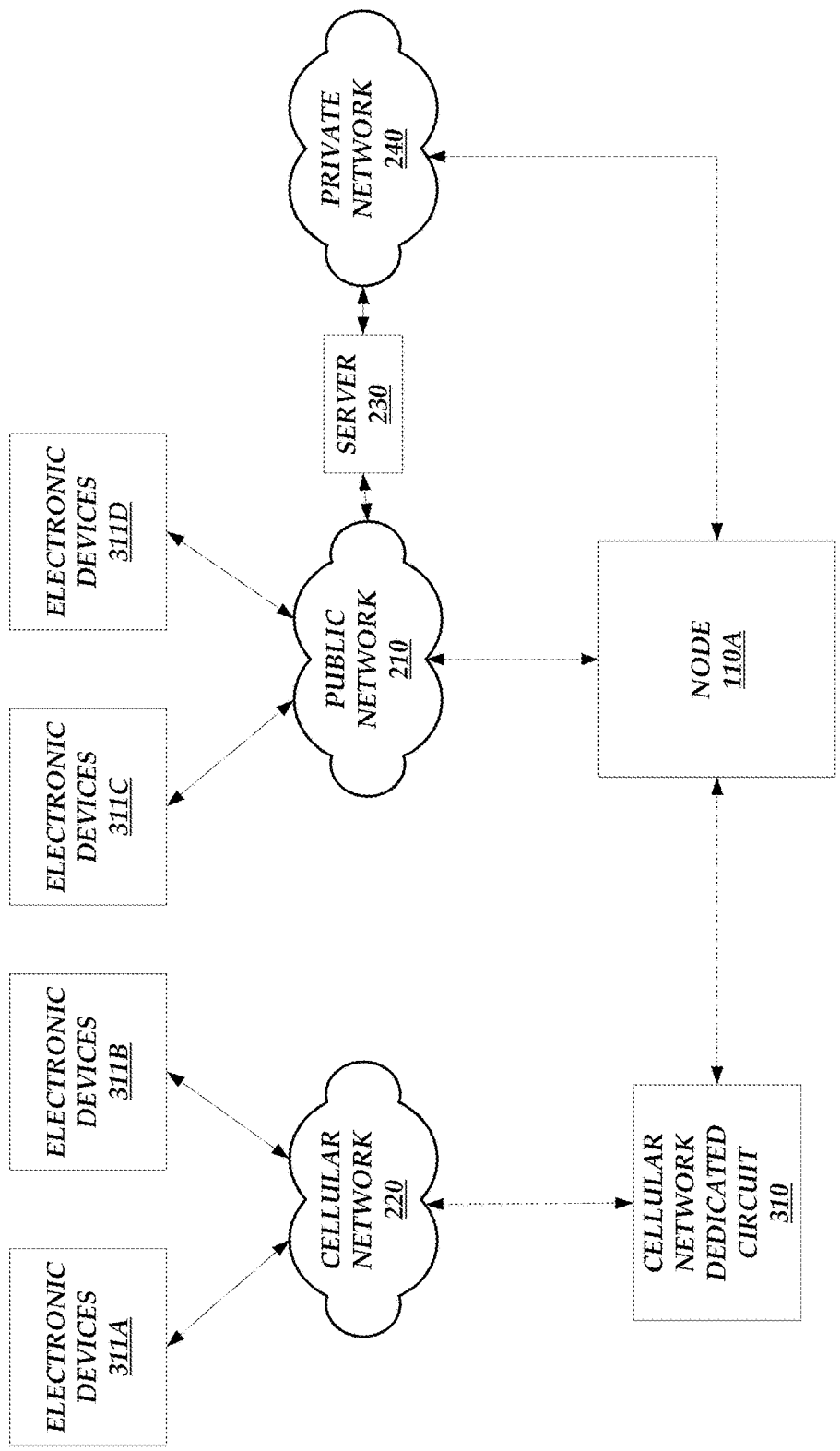
FIG. 3A illustrates an example data flow between IoT devices and a node of FIG. 1.

FIG. 3A illustrates an example data flow between IoT devices, such as electronic devices 311, and the node 110A. While FIG. 3A illustrates three different ways that the node 110A can communicate with various electronic devices 311, this is not meant to be limiting. The node 110A can communicate with electronic devices 311 using any combination of the different ways illustrated in FIG. 3A. For example, the node 110A can communicate with electronic devices 311A-B via a cellular network dedicated circuit 310 and the cellular network 220. The cellular network dedicated circuit 310 may provide an interface between the node 110A and the internal networking components of the cellular network 220. This example is described in greater detail below with respect to FIG. 3B. As another example, the node 110A can communicate with electronic devices 311C-D via the public network 210. This example is described in greater detail below with respect to FIG. 3C. As another example, the node 110A can communicate with the electronic devices 311C-D via the network 240 and the server 230.

Figure 3B:
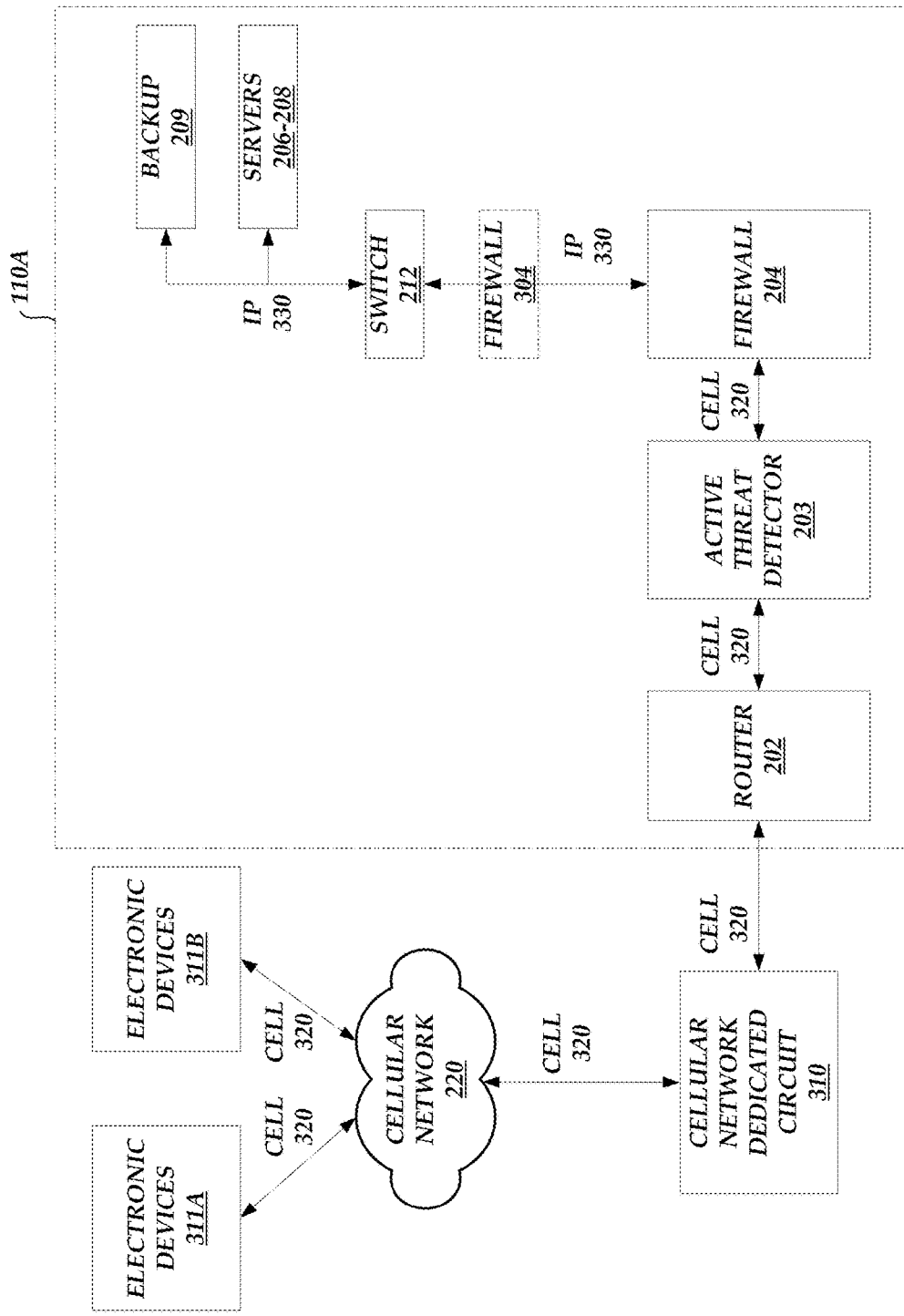
FIG. 3B illustrates an example data flow between electronic devices and the components in a node of FIG. 1 via a cellular network.

FIG. 3B illustrates an example data flow between IoT devices, such as the electronic devices 311A-B, and the components in node 110A via the cellular network 220. As illustrated in FIG. 3B, the router 202 can receive communications from and transmit communications to the cellular network dedicated circuit 310. The communications may be encapsulated according to a cellular carrier protocol 320. In an embodiment, the electronic devices 311A-B are capable of communicating via the cellular network 220. Thus, the data transmitted between the electronic devices 311A-B and the router 202 are encapsulated according to the cellular carrier protocol 320. In addition, the router 202 may route such data to the active threat detector 203 and the active threat detector 203 may route such data (e.g., after filtering none, some, or all of the data) to the firewall 204. The data transmitted between these components 202-204 may still be encapsulated according to the cellular carrier protocol 320.

In an embodiment, the firewall 204 converts the data from the cellular carrier protocol 320 to an Internet protocol (IP) 330 or another similar network-based protocol. The data may pass through another firewall 304 before reaching the switch 212. The switch 212 then routes the data encapsulated according to the IP 330 to one of the servers 206-208 or the one or more backup repository servers 209.

Likewise, data from the one or more backup repository servers 209 or one of the servers 206-208 can be transmitted to the switch 212 and can be encapsulated according to the IP 330. The switch 212 can forward the data to the firewall 204. The firewall 204 can then convert the data from the IP 330 to the cellular carrier protocol 320 and the re-encapsulated data can then be forwarded to the active threat detector 203, the router 202, and the cellular network dedicated circuit 310 before reaching the cellular network 220 and eventually one of the electronic devices 311A or 311B.

Figure 3C:
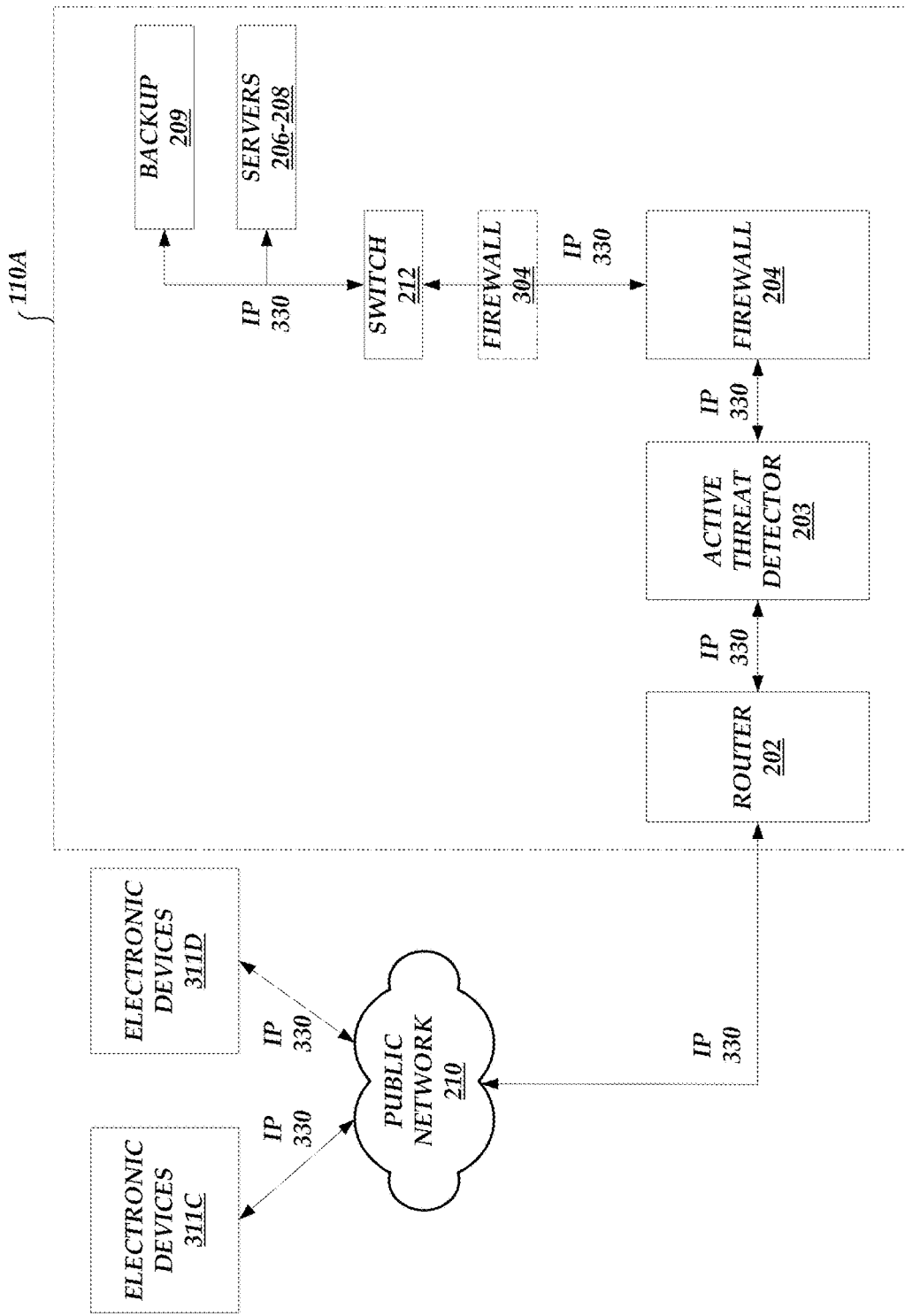
FIG. 3C illustrates an example data flow between electronic devices and the components in a node of FIG. 1 via a public network.

FIG. 3C illustrates an example data flow between IoT devices, such as the electronic devices 311C-D, and the components in the node 110A via the public network 210. Unlike the example illustrated in FIG. 3B, all data transmitted between the electronic devices 311C-D and one of the servers 206-208 or the one or more backup repository servers 209 are encapsulated according to the IP 330. While FIGS. 3B and 3C are illustrated as separate examples, this is not meant to be limiting. The node 110A can handle data encapsulated according to the IP 330 received from and transmitted to the public network 210, data encapsulated according to the cellular carrier protocol 320 received from and transmitted to the cellular network dedicated circuit 310, and/or data encapsulated according to any proprietary protocol received from and transmitted to the network 240.

End-to-End Protection

As described above, conventional data network systems may have gaps in their security schemes. Some conventional data network systems may allow data to be transmitted in an unsecured manner over a public network, such as the Internet, leaving open the possibility that the data can be captured, snooped, or otherwise accessed by an unauthorized user. Some conventional data network systems may store or transmit encryption keys together with encrypted data, allowing the encrypted data to be easily compromised. The multi-node environment described herein seeks to close such security gaps.

For example, a node, such as one of the nodes 110A-N, implements security protocols at an interface between the private network 101 and the public network 210 and the internal components of the respective node 110A-N (e.g., the SIEM 201) to guard against external cyberattacks. Security solutions at the network interface work in tandem with system-internal controls to enforce information flow through secure connections and configurations. As an example, Secure Socket Layer (SSL) encryption can be used to secure data that is transmitted between electronic devices 211 and the node 110A via the public network 210. The node 110A can perform SSL decryption within a secure boundary (e.g., the SIEM 201) in which the decrypted and/or clear-text data only exists for a finite duration of time. The node 110A can re-encrypt the decrypted data using encryption keys securely generated by the encryption key management system 205. The node 110A can employ a robust encryption algorithm, such as AES-256, to encrypt the data as the data is stored onto a storage drive, such as a storage drive included in the storage servers 208. In an alternative embodiment, a tunnel encryption, such as a Virtual Private Network (VPN) encryption, protects data transmission between electronic devices 211 and the node 110A. Communications that are entirely within the node 110A can also be encrypted.

In an embodiment, the STEM 201 is configured to perform threat detection, real-time response, automatic event logging, and/or post-event analysis. For example, the node 110A (e.g., the STEM 201) can detect some or all unauthorized access attempts and enforce appropriate security responses (e.g., disabling access after multiple access failures within a predetermined period of time). The node 110A (e.g., the STEM 201) can perform automatic logging of some or all security-related system events, including successful and/or unsuccessful account login events, account management events, object access, policy change, privilege functions, process tracking, and/or system events. The node 110A (e.g., the STEM 201) can also perform automatic logging of some or all security-related web-application events, including some or all administrator activity, authentication checks, authorization checks, data deletions, data access, data changes, permission changes, remote connections to the node 110A, and/or some or all unauthorized access attempts. An event monitor and analyzer within the node 110A (e.g., within the STEM 201) can perform post-event analysis and permit comprehensive security auditing and process management.

The operations performed by the STEM 201 at the network interface of the node 110A include monitoring and controlling communications sent and received via the various networks 101 and 210. Such operations performed by the STEM 201 may work in tandem with internal security techniques implemented by other components of the node 110A that monitor and control communications at key internal boundaries within the node 110A. The SIEM 201 may implement a wireless intrusion detection system to identify rogue wireless devices and to detect attack attempts and potential compromises/breaches to the information system.

The node 110A can enforce encryption on some or all remote access connections, whether initiated by a user or a system administrator. Some or all data can be encrypted. Further, in some embodiments, the node 110A configures some or all secure connections to use managed entry points that employ boundary protection devices (e.g., SIEMs).

In an embodiment, the node 110A (e.g., the one or more monitoring servers 207) employs a multi-factor authentication scheme to prevent unauthorized access. For example, the multi-factor authentication can include a username and password, a secure code separately transmitted to a first user device associated with a user that is attempting to access the node 110A via a second user device, biometrics (e.g., a fingerprint, a vein map, a behavioral signature, such as physiological characteristics of a user that describe a way the user interacts with an input device (e.g., a keyboard, touch pad, mouse, etc.), etc.), and/or the like. Through authentication, the node 110A can uniquely identify and authenticate users and/or user processes with unique identifiers and enforce specific strength requirements on the identifiers. The node 110A can also require users to be authorized with the node 110A before assigning accounts. In an embodiment, the node 110A may, in an emergency or extraordinary situation, temporarily permit an individual to be authenticated with an authenticator with a reduced number of factors compared with normal operation. In some embodiments, multi-factor login verification data is encrypted for confidentiality.

Figure 4:
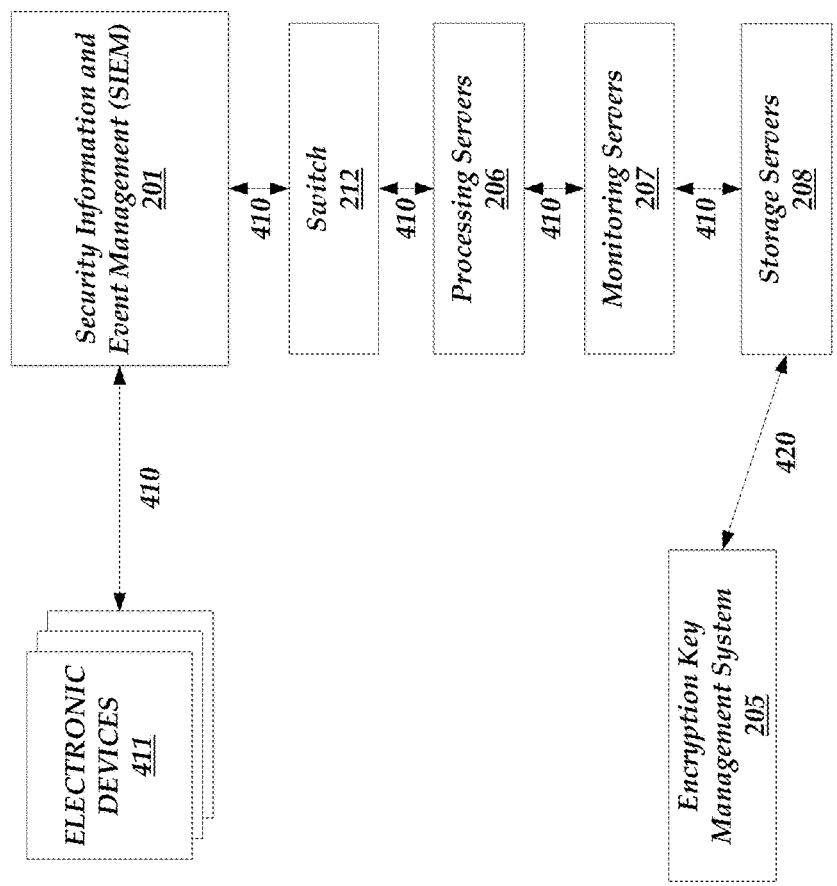
FIG. 4 illustrates an example data flow between an electronic device and the components in a node of FIG. 1.

As described herein, the node 110A can be designed such that communications internal to the node 110A are partitioned or walled off from publically accessible node 110A components. A multi-tier architecture of the node 110A (e.g., the components within the STEM 201) can segment contact between application-specific information (e.g., user data) and other system information (e.g., encryption keys). For example, FIG. 4 illustrates an example data flow between an electronic device 211 and the components in the node 110A. As illustrated in FIG. 4, a first data path 410 includes communications between the electronic device 211 and the SIEM 201, between the SIEM 201 and the switch 212, between the switch 212 and the one or more processing servers 206, between the one or more processing servers 206 and the one or more monitoring servers 207, and between the one or more monitoring servers 207 and the one or more storage servers 208. A second data path 420 includes communications (e.g., the transmission of encryption keys) between the encryption key management system 205 and the one or more storage servers 208. The first data path 410 and the second data path 420 do not overlap and/or do not share communication interfaces such that the information transmitted over one data path cannot be accessed by components in the other data path.

Encryption Key Management (EKM) System

Figure 5:
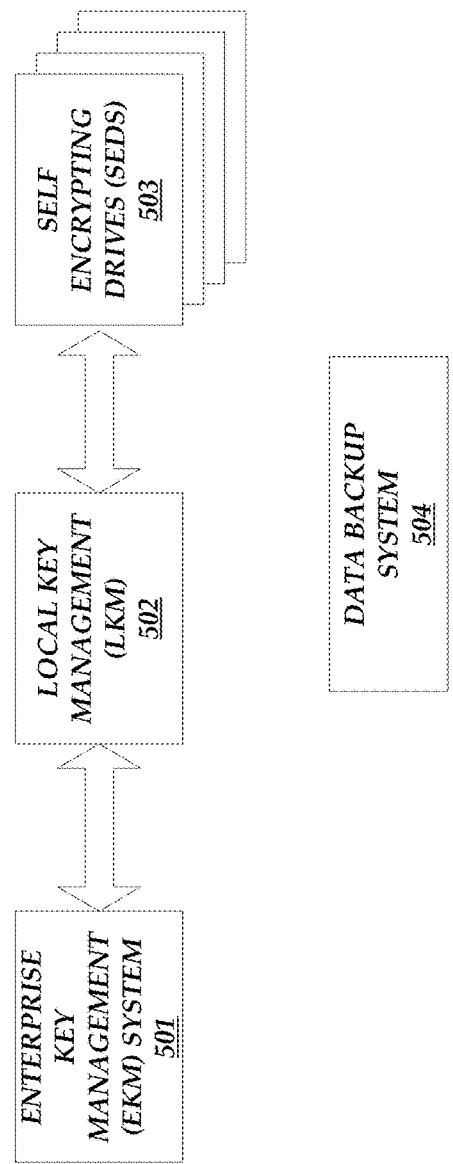
FIG. 5 illustrates a detailed block diagram of the encryption key management system of a node of FIG. 1.

FIG. 5 illustrates a detailed block diagram of the encryption key management system 205 of the node 110A. The encryption key management system 205 includes a key management subsystem to facilitate the use of encryption keys to encrypt user data. For example, as illustrated in FIG. 5, the encryption key management system 205 includes an enterprise key management (EKM) system 501, a local key management (LKM) system 502, and one or more self encrypting drives (SEDs) 503. While FIG. 5 illustrates a single LKM system 502, this is not meant to be limiting. The EKM system 501 may be associated with a plurality of LKM systems 502, and each LKM system 502 may be associated with a separate set of SEDs 503.

In an embodiment, the multi-node environment employs cryptographic security controls to protect the confidentiality and integrity of transmitted information through the deployment of hardware and software solutions. The multi-node environment can enforce cryptographic protection throughout the environment except where the information is otherwise protected within the private network 101. For example, the information may otherwise be protected when a node 110A-N decrypts data encrypted using an SSL channel encryption scheme and re-encrypts the data using a storage drive encryption scheme or decrypts data using a storage drive encryption scheme and re-encrypts the data using an SSL channel encryption scheme.

The encryption of data files within a node 110A-N can be performed in a variety of ways. One approach, for example, may follow standards outlined in NIST FIPS 140-2 documentation where all encryption keys are stored in a depository separate from a location where the encrypted files are stored, backed up, and/or accessed. The EKM system 501 can be configured to serve as the depository that generates and stores all encryption keys. The EKM system 501 can enforce encryption using the encryption keys through native hardware control. The EKM system 501 may then communicate with other hardware components that use encryption keys. The LKM System 502 can manage requests from and transfers of encryption keys to multiple storage drives (e.g., SEDs 503). For example, the LKM system 502 can store information that indicates which encryption keys are being used and/or have been used by a given SED 503, how often an encryption key has been used to encrypt data, encryption key rotation information, and/or the like. The SEDs 503 can be configured to automatically encrypt data using provided encryption keys and store such encrypted data. The SEDs 503 can use embedded hardware to enforce in-line encryption and/or decryption. In some embodiments, clear-text data cannot be extracted from SEDs 503. The use of in-line hardware can minimize the delay associated with encryption and/or decryption operations. The smaller delay, together with key generation and/or management functions included within the encryption key management system 205, can render the encryption process transparent to users (e.g., the user is unaware of the encryption keys used to encrypt user data). This transparency may increase user-friendliness and data security because critical encryption keys never leave the secure domain of the node 110A.

As an example, the EKM system 501 may generate one or more encryption keys. A SED 503 can request an encryption key to be used for encrypting data received from an electronic device 211 associated with a user via the public network 210. The request from the SED 503 can be received by the LKM system 502. The LKM system 502 can then request a new encryption key from the EKM system 501. The EKM system 501 can transmit the encryption key to the LKM system 502 and the LKM system 502 can forward the encryption key to the SED 503. The LKM system 502 can store information indicating that the specific encryption key was sent to the specific SED 503. The LKM system 502 can use this information along with an encryption key rotation policy to anticipate when a new encryption key may be needed for a SED 503. Once the requested encryption key is received by the SED 503, the SED 503 can encrypt and/or decrypt data received from the electronic device 211. The SED 503 may encrypt data as data is received from the electronic device 211. Alternatively, the SED 503 may encrypt data at regular intervals or at a set time.

The data backup system 504 can be configured to back up data stored in the SEDs 503. The data backup system 504 can store backup data on the SED 503 associated with the backup (and the stored backup data can be encrypted by the SED 503 using the same encryption key as used to encrypt the other data stored on the SED 503). For example, the data backup system 504 can receive, from the LKM system 502, the encryption key currently being used by the SED 503 to encrypt and decrypt data. The data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then perform a data backup of the SED 503 (e.g., a data backup of the encrypted data or a data backup of the decrypted data, where the data backup system 504 decrypts the encrypted data using the received encryption key) and replace the old decrypted backup data with new backup data. The data backup system 504 can receive another encryption key from the LKM system 502 or another LKM system local to the data backup system 504 and use this encryption key to encrypt the new data backup before storing the new, encrypted data backup on the SED 503. The new, encrypted data backup on the SED 503 may be stored with a different encryption flag to identify the data as being encrypted with a different key than the key used to encrypt the other data stored on the SED 503. The data on the SED 503, including (or not including) the new, encrypted data backup, may then be encrypted using a new key provided by the LKM system 502.

If the user requests a data restore, the data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then initiate a restore of the decrypted backup data. The backup data can be restored to the SED 503 and/or transmitted to the user. Once the restore is complete, the data backup system 504 can re-encrypt the decrypted backup data and store the encrypted backup data on the SED 503 (and re-encrypt all of the data stored on the SED 503 as described above).

Thus, in some embodiments, the data backup is encrypted by the data backup system 504 using a first encryption key and then the encrypted data backup (along with the other data stored on the SED 503) is encrypted again by the SED 503 using a second encryption key. The data backup system 504 can be a standalone component in the encryption key management system 205 or the functionality described above for the data backup system 504 can be performed by the one or more backup repository servers 209.

In an embodiment, the encryption key management system 205 produces, controls, and/or distributes symmetric encryption keys using NIST FIPS-compliant key management technology and processes. The encryption key management system 205 can also produce, control, and/or distribute asymmetric encryption keys using NSA-approved key management technology and processes. The encryption key management system 205 may obtain public key certificates under an appropriate certificate policy from an approved service provider.

In an embodiment, the multi-node environment employs cryptographic security controls to protect the confidentiality and integrity of data through the deployment of hardware and software solutions throughout the environment. The cryptographic security controls protect data, whether at rest or in transit.

Encryption Key Management System Redundancy

Figure 6:
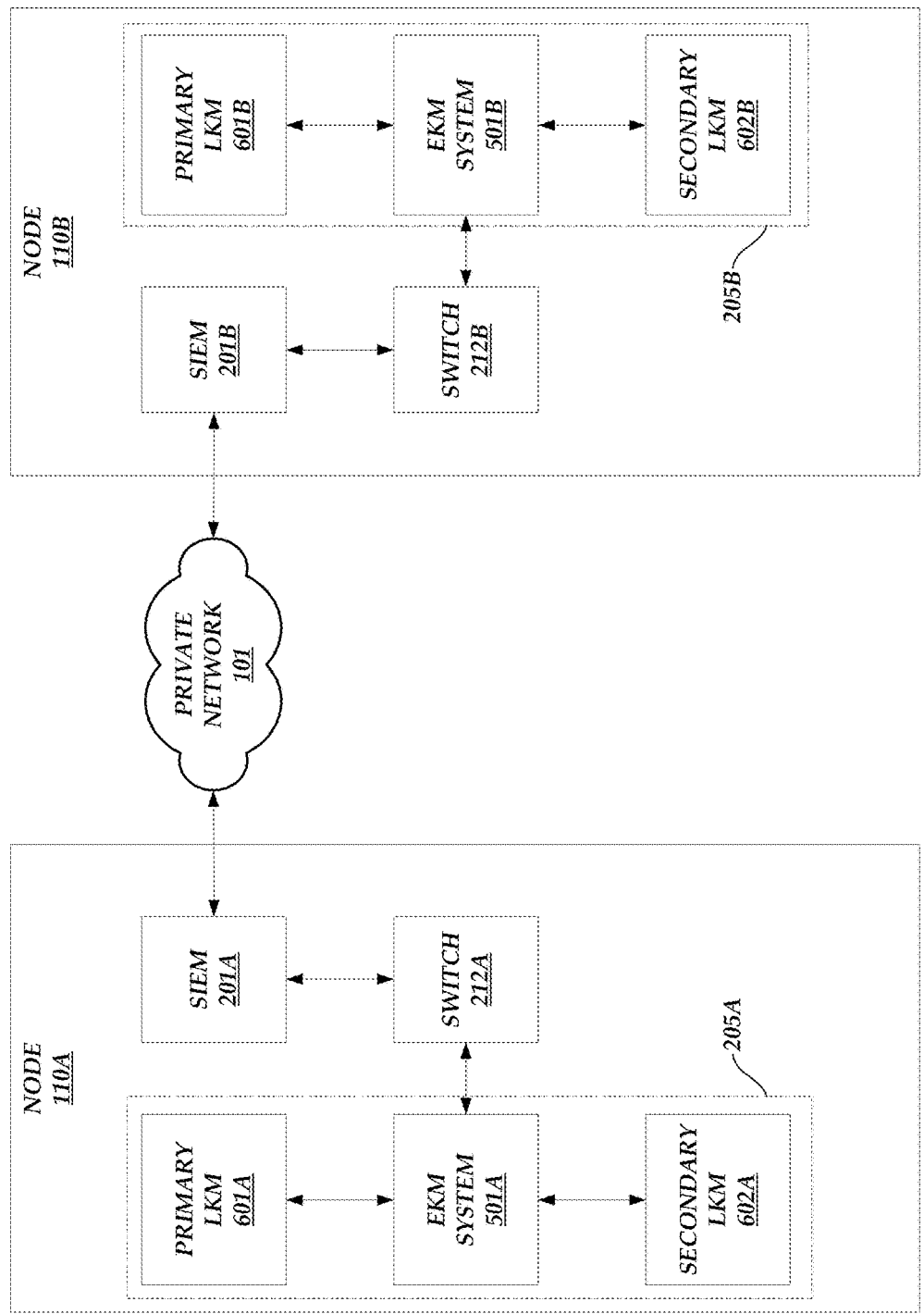
FIG. 6 illustrates the redundancy of the encryption key management systems of FIGS. 2A-2B between the nodes of FIG. 1.

FIG. 6 illustrates the redundancy of the encryption key management systems 205A-B between nodes 110A-B. FIG. 6 illustrates the interaction between the encryption key management systems 205A-B of nodes 110A-B, respectively, but the techniques disclosed herein can apply to any pair or set of nodes 110A-N. As illustrated in FIG. 6, the node 110A includes an encryption key management system 205A that includes an EKM system 501A, a primary LKM 601A, and a secondary LKM 602A. Similarly, the node 110B includes an encryption key management system 205B that includes an EKM system 501B, a primary LKM 601B, and a secondary LKM 602B.

In an embodiment, the primary LKMs 601A-B are active in normal operation and the secondary LKMs 602A-B are used for disaster recovery. The EKM system 501A can communicate with the EKM system 501B (and any other EKM system of any other node 110C-N) via the switch 212A, the SIEM 201A, the private network 101, the SIEM 201B, and the switch 212B. The EKM systems 501A-B can communicate, for example, so that both EKM systems 501A-B include the encryption keys generated by the other EKM system 501A-B (and/or the other EKM systems in the multi-node environment) so that an encryption key management system of one node can operate in place of another encryption key management system of another node when that encryption key management system in the other node is down or inactive.

For example, the secondary LKM 602A may be a backup copy of the primary LKM 601B. Similarly, the secondary LKM 602B may be a backup copy of the primary LKM 601A. The primary LKMs 601A-B may periodically be backed up so that the secondary LKMs 602A-B have current data. The EKM system 501A and/or the primary LKM 601A (via the EKM system 501A) of the node 110A can monitor the primary LKM 601B of the node 110B by periodically polling the primary LKM 601B (e.g., and determining that the LKM 601B is active if a response to the poll is received). If the primary LKM 601B becomes unavailable or inactive (as determined by the polling of the primary LKM 601B), the primary LKM 601A and/or the EKM system 501A activates the secondary LKM 602A, which then functions as the primary LKM of the node 110B. The secondary LKM 602A can operate as the primary LKM of the node 110B because of the exchange of encryption keys between the EKM systems 501A-B and/or because of the periodic backups of the primary LKM 601B (which are stored in the secondary LKM 602A).

If the primary LKM 601B becomes active again (as determined by the polling of the primary LKM 601B), the secondary LKM 602A synchs with the primary LKM 601B so that the primary LKM 601B has the most up-to-date information. The secondary LKM 602A then ceases to function as the primary LKM of the node 110B and the primary LKM 601B resumes normal operation as described herein.

Multi-Factor Authentication

The most common type of process to authenticate a user is via a username and password. For example, a user is prompted to enter a username and password combination. If the entered combination matches a stored combination associated with the user, then the user is provided access to secure data. A username and password combination alone, however, may not prevent unauthorized users from gaining access to the secure data. For example, an unauthorized user could discreetly obtain the authorized user's username and/or password (e.g., via a key logger, data snooping, attempting multiple combinations of usernames and/or passwords, etc.) and access the secure data.

If a system allowed access to the secure data in response to the user providing a username and password combination and some other unique or identifying data (e.g., a code provided to a device operated by the user or an account associated with the user, a fingerprint, a retina scan, etc.), then the likelihood that an unauthorized user can access the secure data is reduced. Accordingly, many systems now employ multi-factor authentication techniques to try to prevent unauthorized users from gaining access to secure data.

However, even typical systems that use multi-factor authentication have flaws. For example, some systems use an iris scan as one factor in determining whether to authenticate a user. However, the systems can be fooled by being presented with a high-resolution image of an iris of an authorized user. As another example, many systems use a fingerprint scan as one factor in determining whether to authenticate a user. Fingerprints are unique to an individual and thus provide a way to uniquely identify an individual. However, fingerprints can be copied and the copies can be used to authenticate an unauthorized user. For example, when a user places a finger on a fingerprint scanner, the user's fingerprint may remain on the area in which the user placed his or her finger. An unauthorized user can then use any number of known methods to copy the fingerprint from this area. As another example, a camera can be used to take a high resolution image of a person's finger. In fact, cameras in mobile devices are so advanced that a person's fingerprint can be captured at a sufficient resolution from a great distance away. As a more morbid example, a person's finger can be cut off and used to authenticate the unauthorized user.

Accordingly, the systems and methods described herein implement a multi-factor authentication that uses the structure or pattern of a person's vein (or artery) as one of the factors used to determine whether to authenticate a user. In an embodiment, the structure of a person's vein (or artery) can be captured (e.g., scanned) using a vein reader coupled to or embedded within a user device. For example, the vein reader can be coupled to the user's smartphone or can be embedded within the user's smartphone. Once captured, the vein reader can encode the user's vein structure to produce a vein ID that can then be used for authentication purposes.

Using the structure of a person's vein (or artery) can provide several benefits. For example, the vein structure in a person's finger is unique to that person and does not vary as the person's blood pressure changes. In fact, the vein structure stays the same shape unless no more blood is pumped to the vein location (e.g., the finger is dismembered, the person is deceased, etc.). Thus, cutting off a person's finger to allow an unauthorized user to be authenticated is not an option. As another example, the vein structure is not necessarily apparent from great distances and cannot be easily captured using a camera. Generally, the vein can be viewed when a person's finger is sufficiently illuminated from a light source in close proximity to the finger. Thus, a camera, even a camera with a flash, that is a great distance away from the person's finger likely would not be able to capture the vein structure.

In an embodiment, the multi-node environment uses a vein ID produced from a vein structure as one factor in determining whether to allow a user access to a node 110A-N. For example, as described above, the one or more monitoring servers 207 can include an LDAP server. The LDAP server may function to authorize or deny users access to a node 110A-N by determining whether the user passes one or more authentication factors.

The user may provide authentication data to the LDAP server via one or more user devices. The user devices can be electronic devices, such as IoT devices, or other non-IoT electronic devices. As an example, the user may provide the authentication data via a mobile device (e.g., cell phone) and/or a desktop computer.

Figure 7:
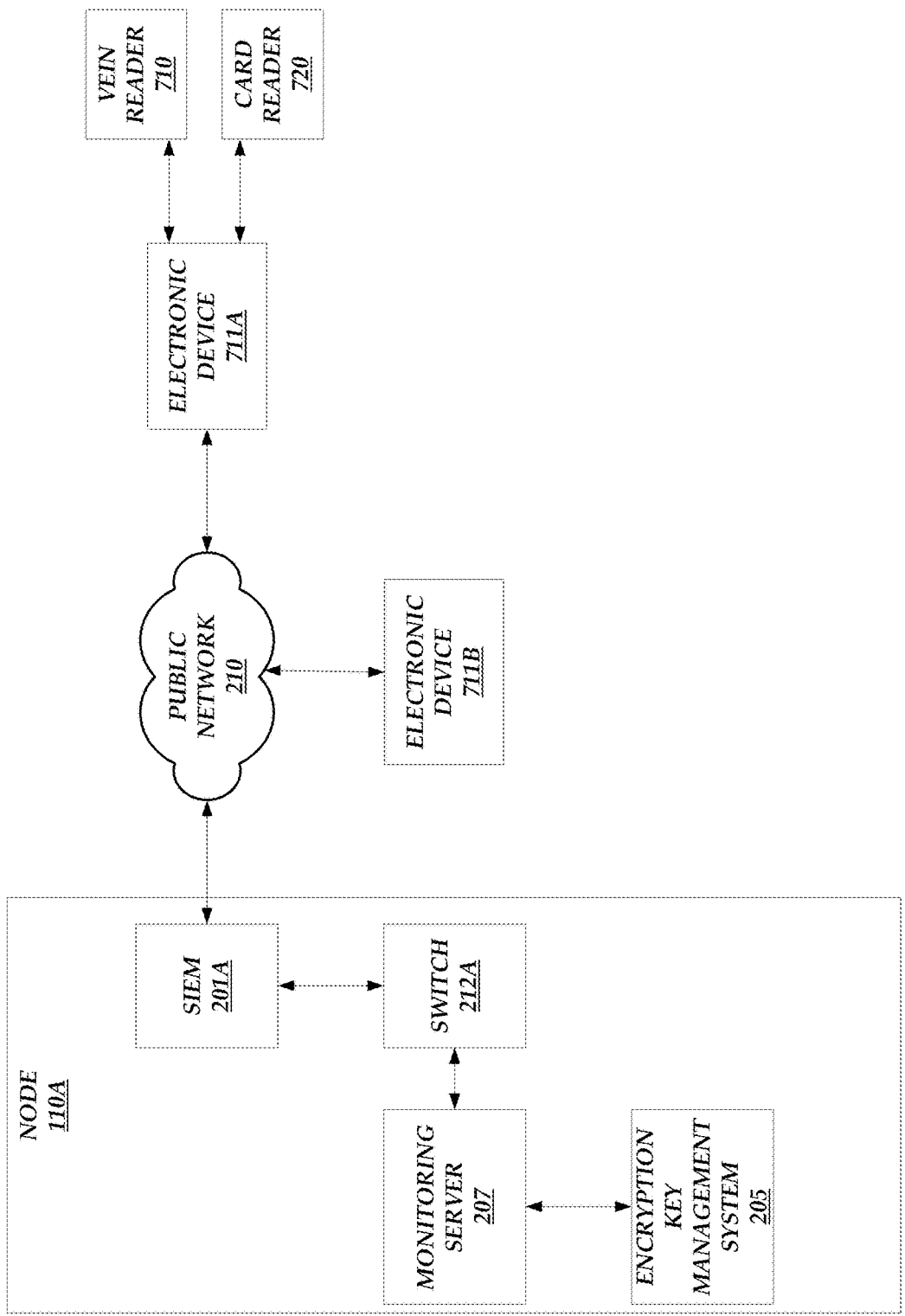
FIG. 7 illustrates an example multi-factor authentication data flow in the multi-node environment of FIG. 1.

FIG. 7 illustrates an example multi-factor authentication data flow in the multi-node environment of FIG. 1. The multi-factor authentication data flow is described herein with respect to the node 110A. However, this is not meant to be limiting as a similar multi-factor authentication data flow can be employed by any of the other nodes 110B-N. In an embodiment, to log into the node 110A, a user provides information associated with various authentication factors using two or more user devices. For example, as illustrated in FIG. 7, the user provides information associated with various authentication factors using the electronic device 711A and the electronic device 711B. In other embodiments, not shown, the user provides information associated with various authentication factors using a single user device, such as the electronic device 711A.

In an embodiment, the electronic device 711A is coupled to a vein reader 710 and/or a card reader 720. The vein reader 710 can be configured to illuminate at least a portion of a person's appendage (e.g., a finger, a palm, etc.), capture an image corresponding to the structure of at least a portion of a vein or artery in the illuminated portion of the appendage, and map the captured image to an alphanumerical value, referred to herein as a vein ID. For example, the mapping can include generating an alphanumerical value based on the width of the vein or artery structure, the length of the vein or artery structure, a number of branches in the vein or artery structure, the distance between the branches in the vein or artery structure, and/or the like. As another example, the mapping can include identifying a plurality of points along an outline of the vein or artery structure (where the points are evenly or unevenly spaced along the outline), generating a mesh or star shape by connecting the identified points, and converting the mesh or star shape into an alphanumerical value (e.g., where the conversion includes generating the alphanumerical value based on the number of unique connections in the mesh or star shape, the number of sides in the mesh or star shape, the distance between one or more points in the mesh or star shape, width of the mesh or star shape, the height of the mesh or star shape, the length of the mesh or star shape, and/or the like). Alternatively, the electronic device 711A can use the image captured by the vein reader 710 to generate the vein ID via any of the methods described herein. An example of a suitable vein reader may be the M2-FINGERVEIN non-invasive finger vein reader produced by M2SYS.

The card reader 720 can be any device configured to read information stored on and/or transmitted by a tag or storage device (e.g., a badge, a credit card, a smart card, a flash memory card, and/or other contact cards that are physically inserted into a reader or that can be read over short distances without physical contact with a reader) and write information to the tag or storage device. For example, the card reader 720 can be a near-field communication (NFC) reader, a radio-frequency identification (RFID) reader, a flash memory reader, a magnetic stripe reader (e.g., a reader that reads information encoded in the magnetic stripe of a card or badge), an EMV standard compliant reader, a scanner, and/or the like.

In other embodiments, not shown, the vein reader 710 and/or the card reader 720 are embedded in the electronic device 711A. The embedding of the vein reader 710 in an electronic device is described in greater detail below with respect to FIGS. 10A-10D.

As described herein, the vein ID can be used by the node 110A as one factor in determining whether to authenticate a user. In addition, information provided by the card reader 720 can be used in conjunction with data associated with one or more factors to determine whether to authenticate a user. The information provided by the vein reader 710 and the card reader 720 can be forwarded to the SIEM 201A via the electronic device 711A and the public network 210.

Furthermore, the electronic device 711A and/or the electronic device 711B can provide additional information associated with additional authentication factors. Such information can include a username/password combination, a code originally generated by the node 110A, behavioral data (e.g., physiological characteristics of a user that describe a way the user interacts with an input device (e.g., a keyboard, touch pad, mouse, etc.), which is described in greater detail below), a fingerprint scan (or an ID associated with the fingerprint scan), and/or the like.

The SIEM 201A can receive information associated with the various authentication factors from the electronic device 711A and/or the electronic device 711B and forward this information to the switch 212A. The switch 212A can then forward the information to the one or more monitoring servers 207 (e.g., the LDAP server). The LDAP server can then process the information to determine whether to authenticate the user, as described in greater detail below. In some embodiments, the one or more monitoring servers 207 use information provided by the encryption key management system 205 to determine whether to authenticate a user.

Figure 8A:
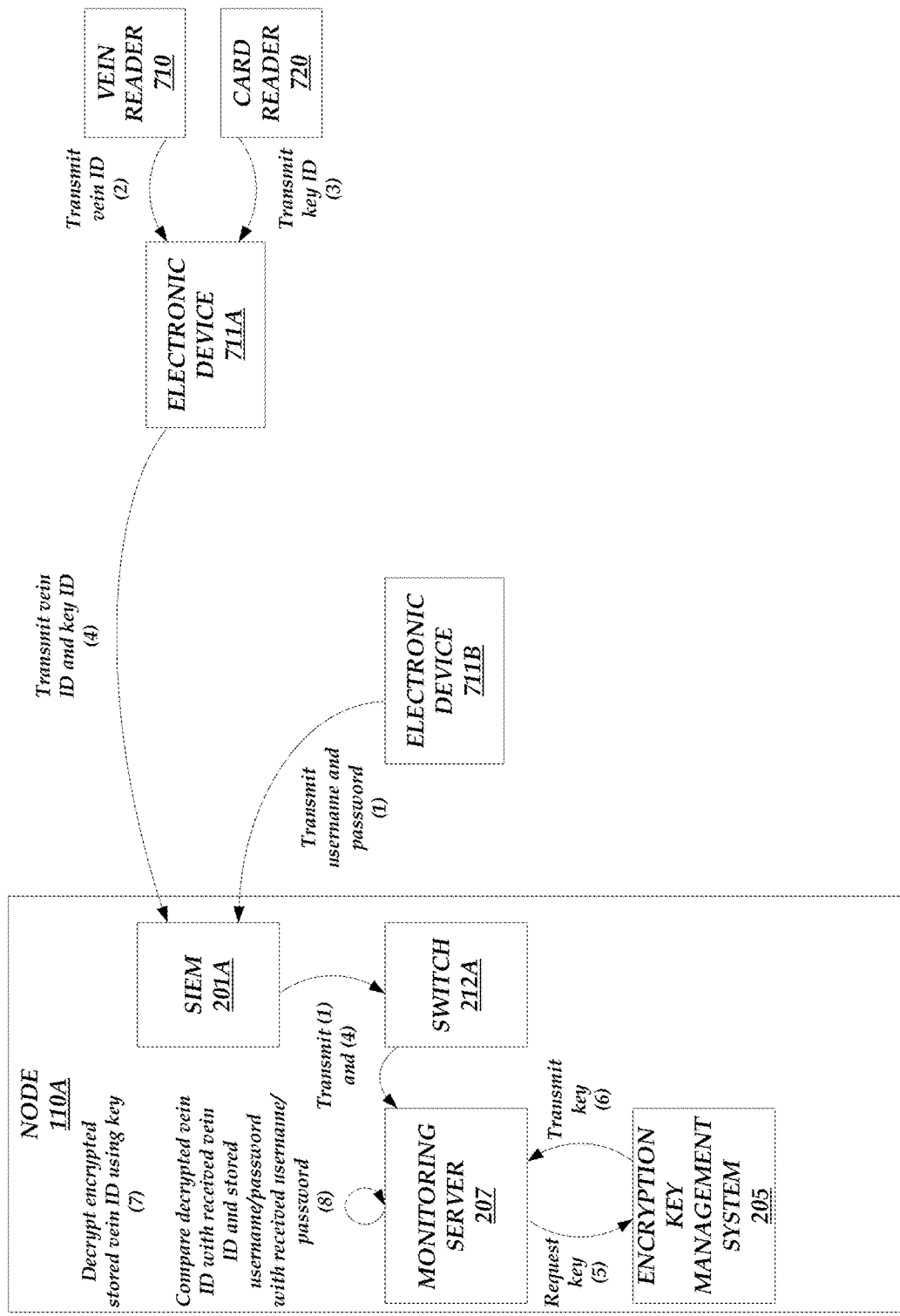
FIG. 8A-8B illustrate a vein authentication data flow diagram between components in the multi-node environment of FIG. 1.
Figure 8B:
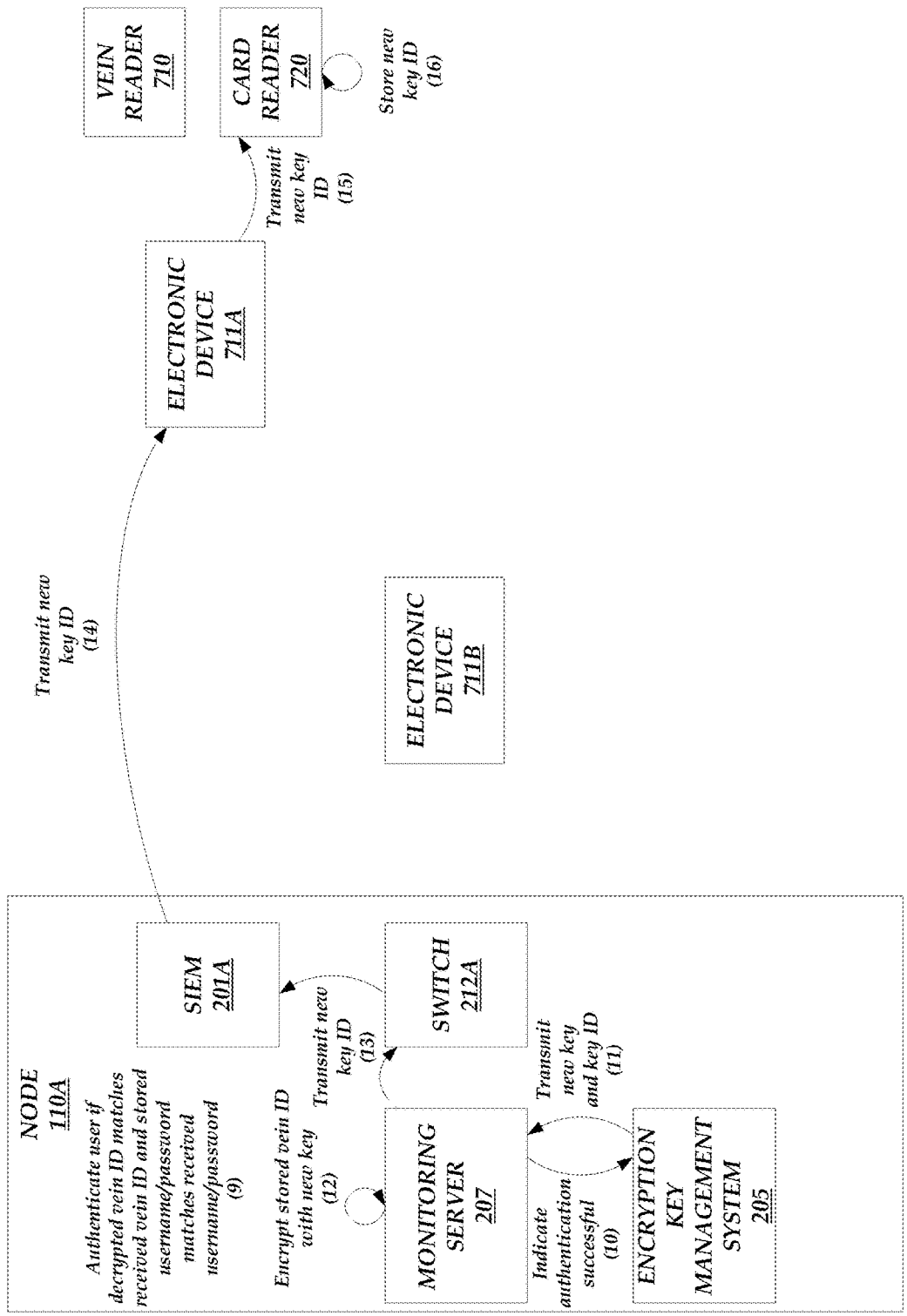

FIG. 8A-8B illustrate a vein authentication data flow diagram between components in the multi-node environment of FIG. 1. As illustrated in FIG. 8A, a user may enter a username and password combination using electronic device 711B. For example, the user may use the electronic device 711B to access a login page (e.g., a content page, such as a web page) generated by the node 110A. The electronic device 711B can then transmit the username and password (1) to the node 110A, and specifically the SIEM 201A. Alternatively, not shown, the user can enter the username and password on the electronic device 711A and the electronic device 711A can transmit this information to the SIEM 201A.

The user can also place a portion of an appendage (e.g., a finger, a palm, etc.) at a designated location to allow the vein reader 710 to capture at least a portion of the vein (or artery) structure in the appendage. The vein reader 710 can then generate a vein ID using the captured vein (or artery) structure and transmit the vein ID (2) to the electronic device 711A. Alternatively, not shown, the vein reader 710 can transmit an image of the captured vein (or artery) structure to the electronic device 711A and the electronic device 711A can generate the vein ID using the received image. In still other alternate embodiments, not shown, the vein reader 710 is embedded in the electronic device 711A and the vein reader 710 transmits the vein ID or the captured image to another component within the electronic device 711A (e.g., a processor, a packet sequencer, a transmitter, etc.). In any of the embodiments described herein, it may be important that the vein reader 710 and/or the electronic devices 711A-B do not retain or allow unauthorized access to the captured image of the vein structure and/or the vein ID. Unauthorized access to such data may enable a replay attack in the event that the vein reader 710 and/or the electronic devices 711A-B are lost or compromised. To prevent such an attack, the vein reader 710 and/or the electronic devices 711A-B may erase any storage (permanent or temporary) used to store the image or any other vein data at the end of each authentication transaction. Alternatively, the vein reader 710 and/or the electronic devices 711A-B may store such data within a secure domain (e.g., an encrypted file) to prevent unauthorized access.

The user can also physically insert a tag or storage device into the card reader 720 or bring the tag or storage device in close proximity to the card reader 720 such that the card reader 720 can receive information stored in the tag or storage device. For example, such information can include a key ID. The card reader 720 can then transmit the key ID (3) to the electronic device 711A. Alternatively, not shown, the card reader 720 is embedded in the electronic device 711A and the card reader 720 transmits the key ID to another component within the electronic device 711A (e.g., a processor, a packet sequencer, a transmitter, etc.).

Once the electronic device 711A receives the vein ID and the key ID, the electronic device 711A transmits the vein ID and the key ID (4) to the SIEM 201A. While the transmission of the username and password, the vein ID, and the key ID are labeled in ascending numerical order, this is not meant to be limiting. The username and password, the vein ID, and the key ID can be transmitted in any order.

The SIEM 201A forwards the transmitted username and password, vein ID, and key ID to the one or more monitoring servers 207 (e.g., the LDAP server) via the switch 212A. In an embodiment, the LDAP server stores information associated with a plurality of users that can be used to authenticate the respective user. For example, users, when initially setting up (e.g., registering) an account with the node 110A, may provide a username and password combination that must be entered when logging in in the future. Users may also use a vein reader, such as the vein reader 710, to capture the structure of a portion of a vein or artery and provide a vein ID. The vein ID provided when a user attempts to log in must match or closely match the vein ID generated when the user set up the account and the username/password combination entered when the user attempts to log in must match the username/password combination provided when the user set up the account in order for the user to be authenticated. Thus, the LDAP server may store, in association with a particular user, a username/password combination and a vein ID.

To account for the vein reader 710 capturing different portions of the same appendage during different log in attempts by a user, the vein reader 710 (or some other device coupled to the vein reader 710) may request that the user provide multiple readings of the appendage from different angles when the account is initially set up (e.g., ask the user to place a finger flat and face down on the area used to capture an image of the vein or artery structure, ask the user to place the finger off-center, ask the user to place the finger angled to the right, ask the user to place the finger angled to the left, etc.). Each reading may correspond to a different vein ID. Alternatively, one or more readings can be combined to form a single vein ID or a range of vein IDs that would be acceptable. In instances in which a range of vein IDs is generated, the vein structure may be converted into the vein ID in a manner such that the consecutive vein IDs are different by a single, neighboring character (e.g., a first vein ID has a last character of "D" and a second vein ID neighboring the first vein ID has a last character of "E").

In some embodiments, to provide extra security, the username/password combination and/or the vein ID can be encrypted using a key provided by the encryption key management system 205 and the encrypted username/password combination and/or the encrypted vein ID is stored by the LDAP server in association with a particular user. Accordingly, upon receiving the information transmitted by the electronic devices 711A-B, the LDAP server requests a key (5) from the encryption key management system 205. In an embodiment, the key ID may be an alphanumerical value that references a key stored in the encryption key management system 205 that was used to encrypt the username/password combination and/or the vein ID stored by the LDAP server. Thus, the LDAP server can request the key referenced by the key ID by providing the key ID to the encryption key management system 205. In an embodiment, the encryption key management system 205 identifies the key referenced by the key ID and transmits the key (6) to the LDAP server.

The LDAP server may then decrypt the encrypted username/password combination (if encrypted) and/or the encrypted vein ID (if encrypted) using the received key (7). The LDAP server then compares the decrypted username/password combination (or the stored username/password combination if the combination was not encrypted) with the username/password combination received from the electronic device 711B and compares the decrypted vein ID (or the stored vein ID if the vein ID was not encrypted) with the vein ID received from the electronic device 711A (8).

If the decrypted (or stored) username/password combination matches the received username/password combination and the decrypted (or stored) vein ID matches or closely matches (e.g., the IDs are off by a single, neighboring character, such as the received vein ID has a "D" instead of a "C", or the received ID falls within a range identified by the decrypted and/or stored vein ID) the received vein ID, then the user is authenticated (9), as illustrated in FIG. 8B. An indication that the user has been authenticated can be transmitted by the LDAP server to the electronic device 711A and/or the electronic device 711B.

Thus, the key ID can be an important piece of information in determining whether to authenticate a user. In some cases, the tag or storage device that stores the key ID can be lost or stolen or the information stored in the tag or storage device can be lost or stolen. While the actual key used to decrypt the username/password combination and/or the vein ID would still be hidden from an unauthorized user that stole the key ID, the unauthorized user could possibly still gain access to the node 110A. Accordingly, the LDAP server can implement an additional safety feature—the rotation of the key used to decrypt/encrypt the username/password combination and/or the vein ID after each successful login attempt. For example, the LDAP server can transmit an indication to the encryption key management system 205 that authentication of the user is successful (10). The encryption key management system 205 then performs a key rotation, selecting a new key for encrypting the username/password combination and/or the vein ID. The encryption key management system 205 then transmits the new key and the key ID that references the new key (11) to the LDAP server.

The LDAP server can then encrypt the decrypted version of the username/password combination and/or the decrypted version of the vein ID using the new key (12). The LDAP server can also transmit the key ID referencing the new key (13) to the SIEM 201A via the switch 212A. The SIEM 201A can then transmit the key ID referencing the new key (14) to the electronic device 711A. The electronic device 711A can forward the new key ID to the card reader 720 (15) and the card reader 720 can store the new key ID (16) on the tag or storage device provided by the user. Thus, the next time the user attempts to log in, the new key ID is provided to the LDAP server, and the new key ID will correctly reference the key used to encrypt the username/password combination and/or the vein ID. Accordingly, if an unauthorized user somehow manages to steal a previous key ID, the previous key ID would no longer lead to a successful authentication because the previous key ID would reference the wrong key.

Figure 9A:
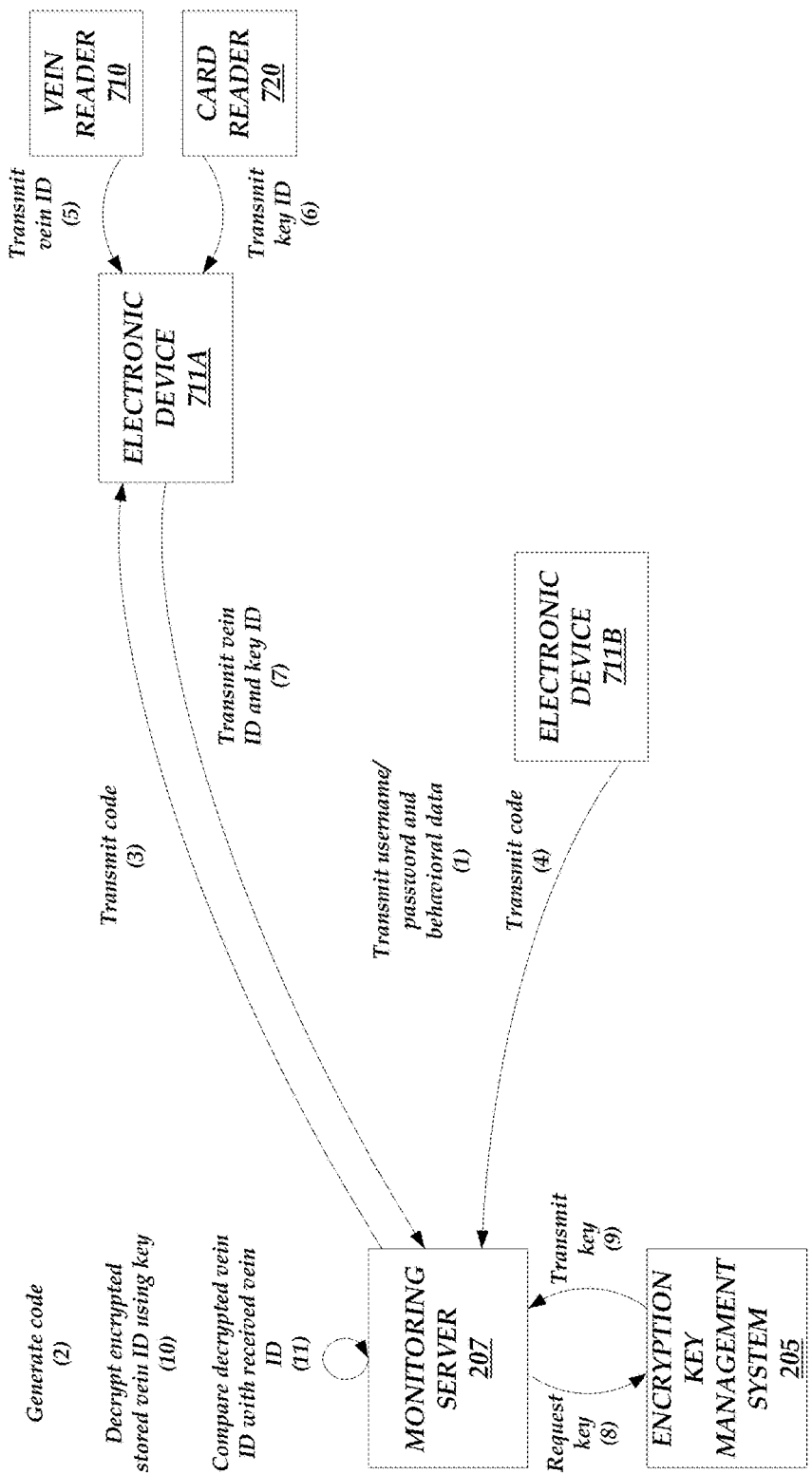
FIG. 9A-9B illustrate a multi-factor data flow diagram between components in the multi-node environment of FIG. 1.
Figure 9B:
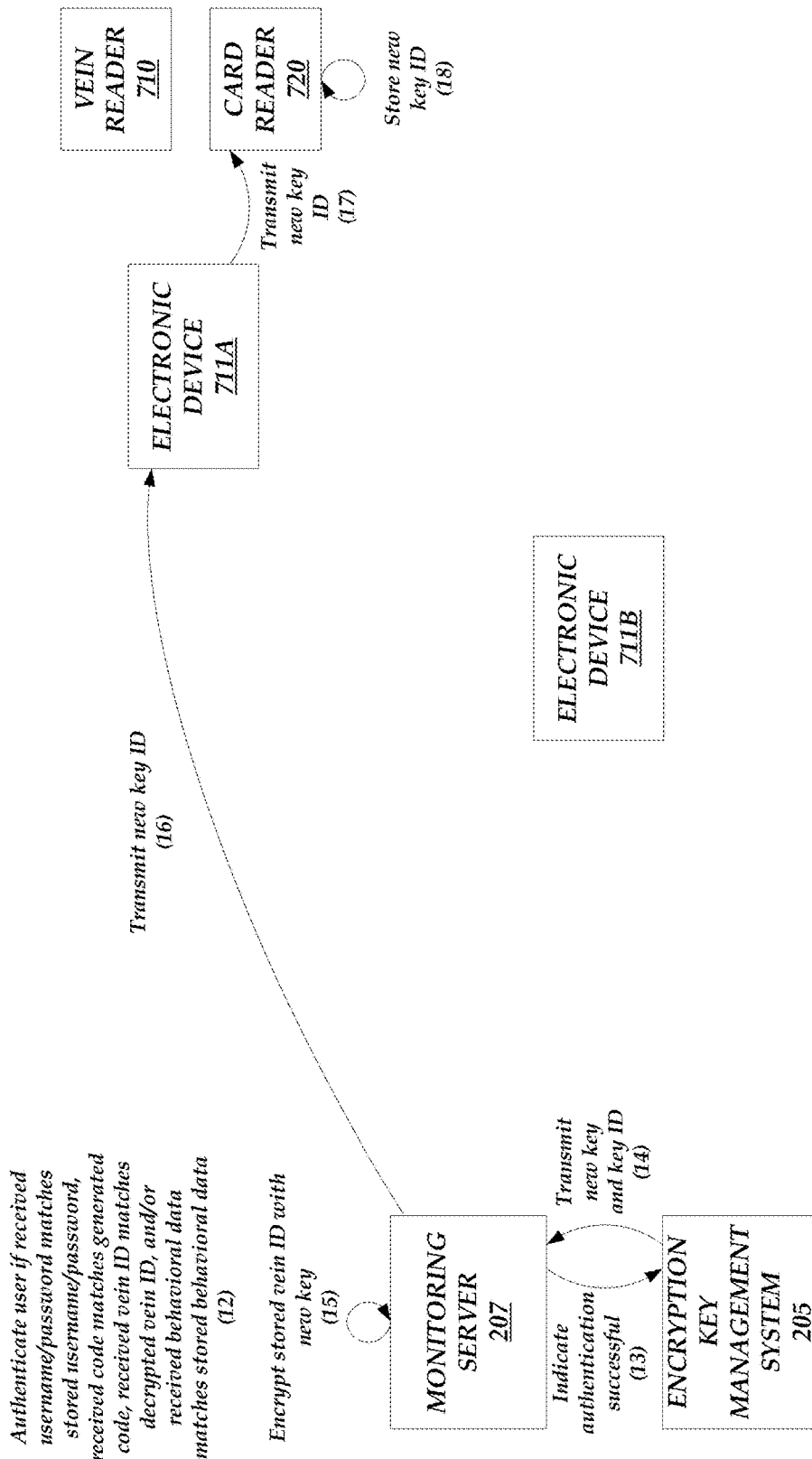

FIG. 9A-9B illustrate a multi-factor data flow diagram between components in the multi-node environment of FIG. 1. For ease of illustration, the SIEM 201A and the switch 212A are not illustrated. However, any data transmitted to and from the one or more monitoring servers 207 may pass through the SIEM 201A and the switch 212A. As described herein, the username/password combination and the vein ID may not be the only factors considered in determining whether to authenticate a user. To provide extra security, additional information can be provided by the electronic device 711A and/or the electronic device 711B. For example, as illustrated in FIG. 9A, the electronic device 711B can transmit behavioral data in addition to the username/password combination (1) to the LDAP server. Behavioral data can include any physiological characteristics of a user that are derived from a way the user interacts with an input device (e.g., a keyboard, touch pad, mouse, etc.). For example, behavioral data can include the pace at which a user typically types, the force by which a user taps a touch screen, the angle at which a user typically selects a physical or virtual button, the propensity for the user to enter certain words or numbers, content pages that the user typically accesses, the order in which the user typically accesses content pages, the angle at which the user holds the input device or the user device coupled to the input device, movement typically detected by sensors (e.g., gyroscope, accelerometer, etc.) embedded in the input device or the user device coupled to the input device when the user enters, the amount of time that typically passes between each click of a mouse button by the user, the amount of time that typically passes between each selection of a physical or virtual keyboard button by the user, and/or the like.

At the time that the user sets up the account, the user can be prompted to enter one or more phrases, select and/or unselect boxes using a cursor, make designated gestures on a touch screen, and/or the like using an electronic device. This information can be captured by sensors embedded in or coupled to the electronic device and transmitted to the node 110A. The information can be routed to the LDAP server and stored in association with the user for future authentication purposes. The electronic device 711B can capture behavioral data at the time that the user attempts to access the node 110A by prompting the user to enter one or more phrases, select and/or unselect boxes using a cursor, make designated gestures on a touch screen, and/or the like. Alternatively, the electronic device 711B can capture the behavioral data as the user provides information for another factor used to authenticate the user. For example, the electronic device 711B can capture the behavioral data as the user enters the username and password combination and/or submits this information to the node 110A. As another example, the electronic device 711B can capture the behavioral data as the user enters a code generated by the LDAP server and transmitted to the electronic device 711A or the electronic device 711B. The electronic device 711B can also discreetly capture behavioral data as the electronic device 711B is used. For example, the electronic device 711B can capture the behavioral data as the user uses the electronic device 711B prior to attempting to access the node 110A (e.g., as the user turns on the electronic device 711B, logs into the electronic device 711B, opens a browser window, enters a hyperlink to access the node 110A, etc.).

As described above, in alternate embodiments, not shown, the user can enter the username and password on the electronic device 711A and the electronic device 711A can transmit this information to the LDAP server. Furthermore, the electronic device 711A can capture the behavioral data in any manner as described herein and transmit this information to the LDAP server as well.

In addition to the username/password combination and the behavioral data, the LDAP server can receive a code from the electronic device 711A and/or 711B for authentication purposes. For example, the LDAP server can generate a code (2), such as an alphanumerical value designated for a one-time use that may expire after a threshold period of time. The LDAP server can transmit the code (3) to the electronic device 711A (which has been previously identified by the user as the device to receive any generated codes). For example, the transmission can be in the form of an electronic message (e.g., text message, e-mail message, chat message, etc.) compatible with the electronic device 711A. When the login page for accessing the node 110A is accessed by the user and the user provides some identifying information (e.g., the username), the LDAP server can generate the code for transmission to the electronic device 711A and request that the code be entered on the login page within the threshold period of time (e.g., 1 minute, 10 minutes, etc.). Alternatively, the code can be transmitted to and entered on the same electronic device (e.g., the electronic device 711A or the electronic device 711B). Once entered by the user, the electronic device 711B transmits the code (4) to the LDAP server.

As described above, the user can also place a portion of an appendage (e.g., a finger, a palm, etc.) at a designated location to allow the vein reader 710 to capture at least a portion of the vein (or artery) structure in the appendage. The vein reader 710 can then generate a vein ID using the captured vein (or artery) structure and transmit the vein ID (5) to the electronic device 711A. Alternatively, not shown, the vein reader 710 can transmit an image of the captured vein (or artery) structure to the electronic device 711A and the electronic device 711A can generate the vein ID using the received image. In still other alternate embodiments, not shown, the vein reader 710 is embedded in the electronic device 711A and the vein reader 710 transmits the vein ID or the captured image to another component within the electronic device 711A (e.g., a processor, a packet sequencer, a transmitter, etc.).

The user can also physically insert a tag or storage device into the card reader 720 or bring the tag or storage device in close proximity to the card reader 720 such that the card reader 720 can receive information stored in the tag or storage device. For example, such information can include a key ID. The card reader 720 can then transmit the key ID (6) to the electronic device 711A. Alternatively, not shown, the card reader 720 is embedded in the electronic device 711A and the card reader 720 transmits the key ID to another component within the electronic device 711A (e.g., a processor, a packet sequencer, a transmitter, etc.).

Once the electronic device 711A receives the vein ID and the key ID, the electronic device 711A transmits the vein ID and the key ID (7) to the LDAP server. While the transmission of the username and password, the behavioral data, the vein ID, and the key ID are labeled in ascending numerical order, this is not meant to be limiting. The username and password, the behavioral data, the single-use code, the vein ID, and the key ID can be transmitted in any order.

The vein ID provided when a user attempts to log in must match or closely match the vein ID generated when the user set up the account, the username/password combination entered when the user attempts to log in must match the username/password combination provided when the user set up the account, the behavioral data captured when the user set up the account must match or closely match the behavioral data provided during a login attempt, and/or the code generated by the LDAP server must match the code received during the login attempt in order for the user to be authenticated. Thus, the LDAP server may store, in association with a particular user, a username/password combination, a vein ID, behavioral data, and the single-use code.

In some embodiments, to provide extra security, the username/password combination, the vein ID, the behavioral data, and/or the single-use code can be encrypted using a key provided by the encryption key management system 205 and the encrypted username/password combination, the encrypted vein ID, the encrypted behavioral data, and/or the encrypted single-use code are stored by the LDAP server in association with a particular user. Accordingly, upon receiving the information transmitted by the electronic devices 711A-B, the LDAP server requests a key (8) from the encryption key management system 205. In an embodiment, the key ID may be an alphanumerical value that references a key stored in the encryption key management system 205 that was used to encrypt the username/password combination, the vein ID, the behavioral data, and/or the single-use code stored by the LDAP server. Thus, the LDAP server can request the key referenced by the key ID by providing the key ID to the encryption key management system 205. In an embodiment, the encryption key management system 205 identifies the key referenced by the key ID and transmits the key (9) to the LDAP server.

The LDAP server may then decrypt the encrypted username/password combination (if encrypted), the encrypted vein ID (if encrypted), the encrypted behavioral data (if encrypted), and/or the encrypted single-use code (if encrypted) using the received key (10). The LDAP server then compares the decrypted username/password combination (or the stored username/password combination if the combination was not encrypted) with the username/password combination received from the electronic device 711B, compares the decrypted vein ID (or the stored vein ID if the vein ID was not encrypted) with the vein ID received from the electronic device 711A, compares the decrypted behavioral data (or the stored behavioral data if the behavioral data is not encrypted) with the behavioral data received from the electronic device 711B, and/or compares the decrypted single-use code (or the stored single-use code if the single-use code is not encrypted) with the single-use code received from the electronic device 711B (11).

If the decrypted (or stored) username/password combination matches the received username/password combination, the decrypted (or stored) vein ID matches or closely matches (e.g., the IDs are off by a single, neighboring character, such as the received vein ID has a "D" instead of a "C", or the received ID falls within a range identified by the decrypted and/or stored vein ID) the received vein ID, the decrypted (or stored) behavioral data matches or closely matches (e.g., a majority or a threshold number of individual metrics, like the pace at which a user typically types or the force by which a user taps a touch screen, match) the received behavioral data, and/or the decrypted (or stored) single-use code matches the received single-use code, then the user is authenticated (12), as illustrated in FIG. 9B. While it may be preferable that all four factors (e.g., username/password combination, vein ID, behavioral data, and single-use code) result in a match, it may not be required to authenticate a user. For example, the factors can be ranked and the user can be authenticated as long as a factor ranked above a factor that results in a mismatch results in a match (e.g., if the vein ID is ranked above the single-use code and the vein ID results in a match and the single-use code does not result in a match, the user may still be authenticated). As another example, the user can be authenticated if a majority or a threshold number of the factors (e.g., 3 of the 4 factors) result in a match. As another example, some factors can be considered required and some factors can be considered optional. For a user to be authenticated, the required factors must result in a match. However, if the optional factors do not result in a match, while the user may be authenticated, the user may not have access to all of the resources that the user may normally have access to if all of the factors had resulted in a match. As an illustrative example, if all factors result in a match, then user may be allowed to view IoT data and modify IoT settings. If some of the optional factors do not result in a match, though, then the user may be allowed to view IoT data, but not to modify IoT settings.

An indication that the user has been authenticated can be transmitted by the LDAP server to the electronic device 711A and/or the electronic device 711B. Furthermore, as described above, the LDAP server can implement an additional safety feature—the rotation of the key used to decrypt/encrypt the username/password combination, the vein ID, the behavioral data, and/or the single-use code after each successful login attempt. For example, the LDAP server can transmit an indication to the encryption key management system 205 that authentication of the user is successful (13). The encryption key management system 205 then performs a key rotation, selecting a new key for encrypting the username/password combination, the vein ID, the behavioral data, and/or the single-use code. The encryption key management system 205 then transmits the new key and the key ID that references the new key (14) to the LDAP server.

The LDAP server can then encrypt the decrypted version of the username/password combination, the decrypted version of the vein ID, and/or the decrypted version of the behavioral data using the new key (15). In some embodiments, the decrypted version of the single-use code is not re-encrypted because the single-use code is no longer valid as the LDAP server will generate a new single-use code the next time the user attempts to login. The LDAP server can also transmit the key ID referencing the new key (16) to the electronic device 711A. The electronic device 711A can forward the new key ID to the card reader 720 (17) and the card reader 720 can store the new key ID (18) on the tag or storage device provided by the user. Thus, the next time the user attempts to log in, the new key ID is provided to the LDAP server, and the new key ID will correctly reference the key used to encrypt the username/password combination, the vein ID, the behavioral data, and/or the single-use code.

FIG. 10A-10D illustrate a vein reader embedded in an electronic device, such as the electronic device 711 of FIG. 7. As described above, the vein reader 710 can be coupled to the electronic device 711A. However, the vein reader 710 can also be embedded in the electronic device 711A. For example, the vein reader 710 can include a camera (e.g., a CCD image sensor) and a light source (e.g., an LED, such as a near-infrared LED). The electronic device 711A can include one or more processors configured to execute instructions that direct the electronic device 711A to enable the light source to illuminate a user's appendage, use the camera to capture an image of the user's illuminated appendage (and specifically the vein or artery structure that is visible due to the illumination), and analyze the image to generate the vein ID.

Figure 10A:
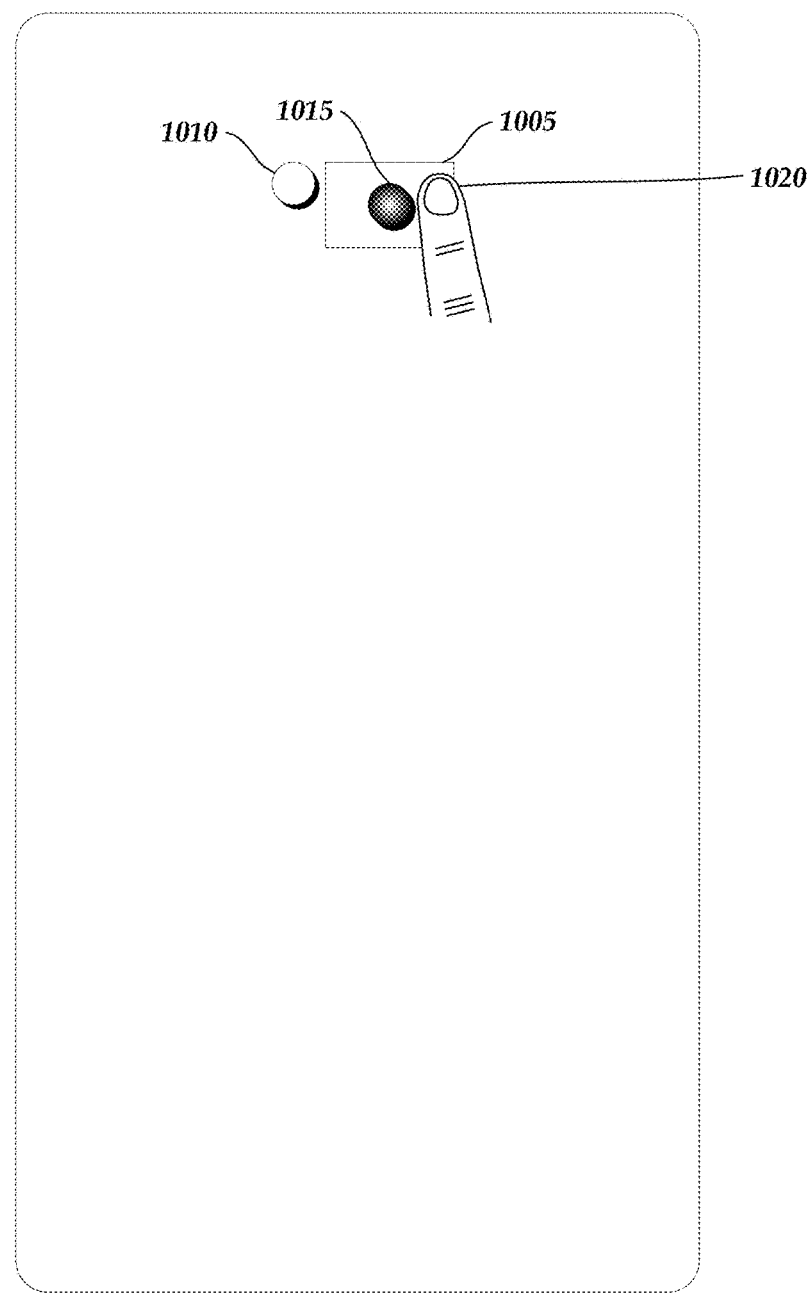
FIG. 10A-10D illustrate a vein reader embedded in an electronic device of FIG. 7.

In an embodiment, the vein reader 710 can reuse the light source already present on most mobile devices and include a pad 1005 for taking vein or artery images. For example, as illustrated in FIG. 10A, the pad 1005 is placed near an already-existing light source 1010. The pad 1005 includes a camera 1015 and the pad 1005 and light source 1010 are located on the backside of the electronic device 711 (e.g., a side of the electronic device 711 that is opposite from a side that includes a touch screen and/or one or more user buttons). During authentication, the user interface displayed on the touch screen of the electronic device 711 may prompt the user to place an appendage, such as a finger 1020, a short distance (e.g., a distance sufficient to allow the appendage to be illuminated in a manner that causes the vein or artery structure to become visible, such as an inch) above the camera 1015 so that an image of the vein or artery structure can be captured.

Figure 10B:
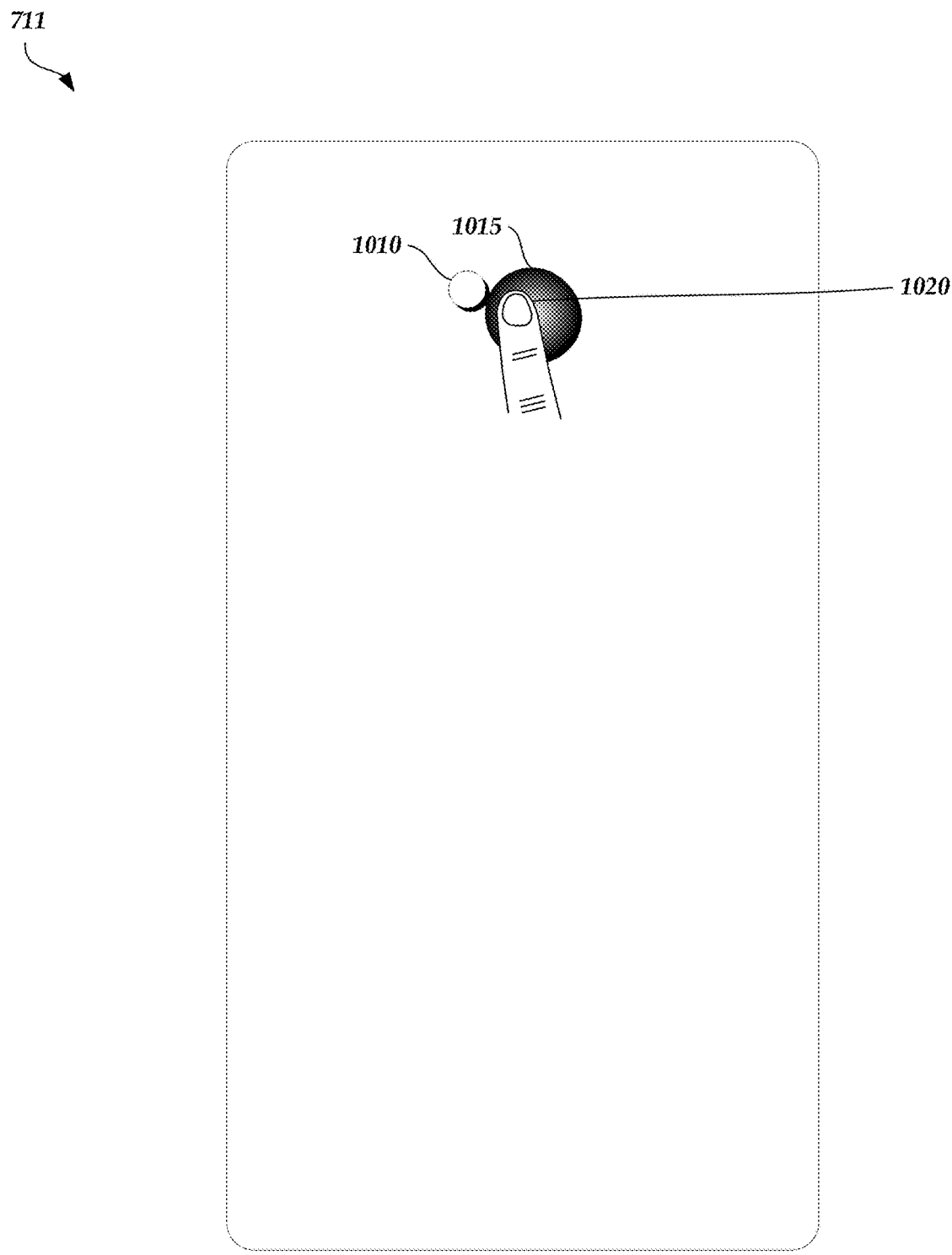

In another embodiment, the vein reader 710 can reuse the camera and light source already present on most mobile devices. For example, as illustrated in FIG. 10B, the light source 1010 is present next to the camera 1015 on the backside of the electronic device 711 (e.g., a side of the electronic device 711 that is opposite from a side that includes a touch screen and/or one or more user buttons). During authentication, the user interface displayed on the touch screen of the electronic device 711 may prompt the user to place an appendage, such as the finger 1020, a short distance (e.g., a distance sufficient to allow the appendage to be illuminated in a manner that causes the vein or artery structure to become visible, such as an inch) above the camera 1015 so that an image of the vein or artery structure can be captured.

Figure 10C:
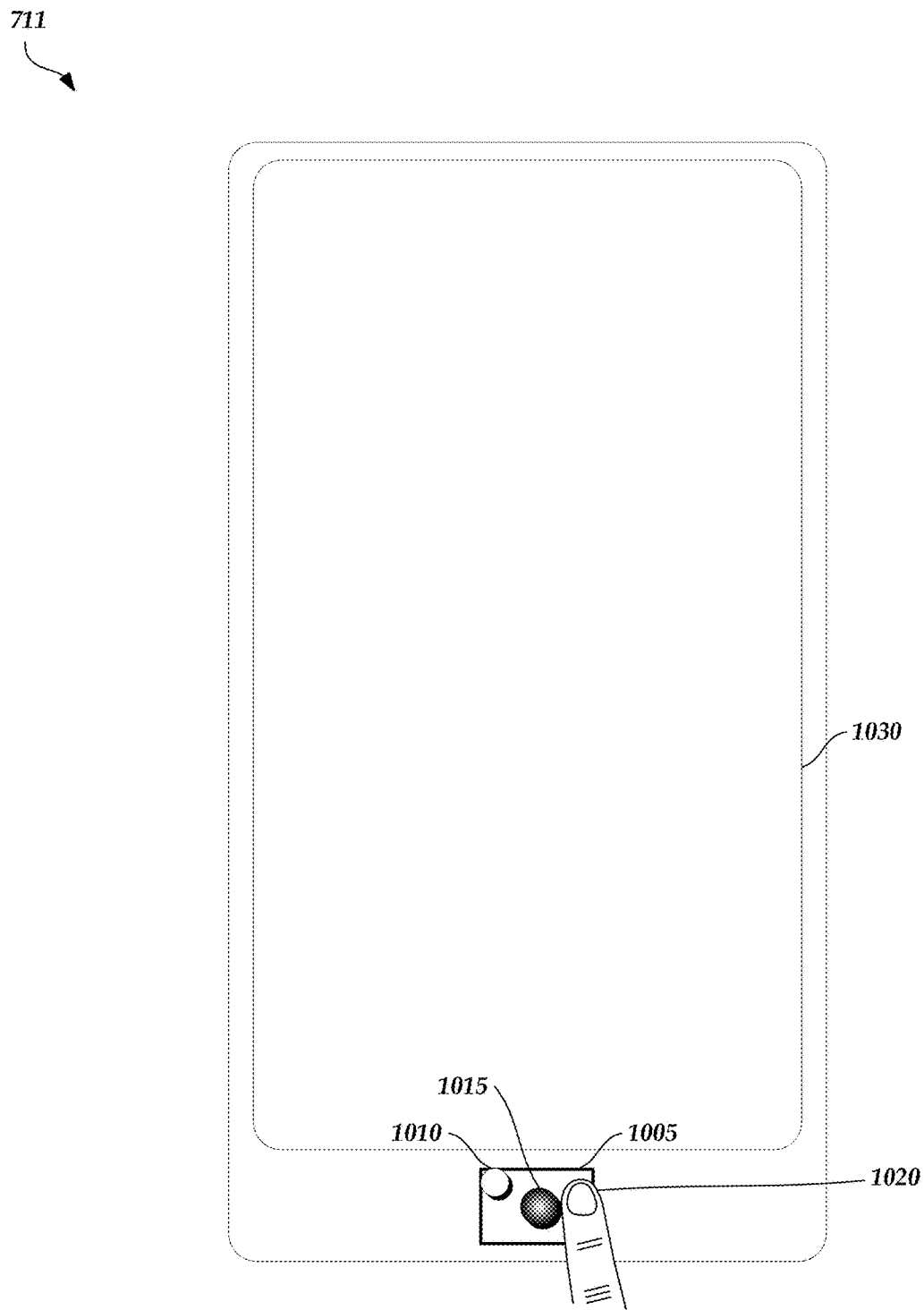

In another embodiment, the vein reader 710 can be embedded on the front side of the electronic device 711 (e.g., a side of the electronic device 711 that includes the user interface). For example, as illustrated in FIG. 10C, the pad 1005 can be located adjacent to a touch screen 1030 that displays the user interface. As described above, the pad 1005 can include the camera 1015. The pad 1005 can also include the light source 1010. During authentication, the user interface displayed on the touch screen 1030 may prompt the user to place an appendage, such as the finger 1020, a short distance (e.g., a distance sufficient to allow the appendage to be illuminated in a manner that causes the vein or artery structure to become visible, such as an inch) above the camera 1015 so that an image of the vein or artery structure can be captured.

Figure 10D:
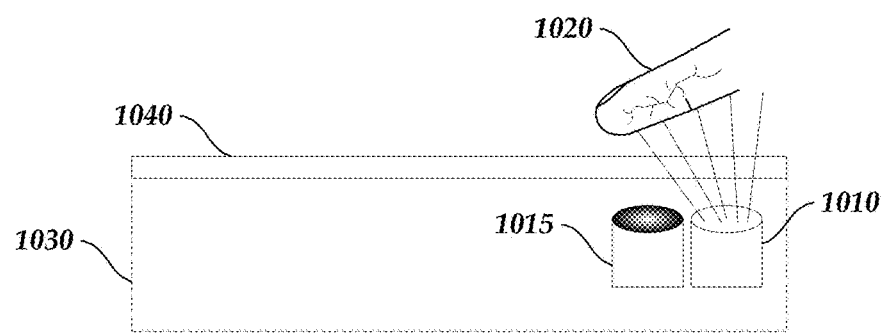

In another embodiment, the vein reader 710 can be embedded underneath within the touch screen 1030, underneath a covering that protects the touch screen 1030. This may be possible because no physical contact is actually required between the vein reader 710 and the user's appendage. For example, as illustrated in FIG. 10D, the light source 1010 and the camera 1015 are located within the touch screen 1030, underneath a cover 1040 (e.g., a transparent cover, such as specially-formulated glass) protecting the touch screen 1030. The touch screen 1030 may include various layers, such as a layer with spacer dots, an ITO coating layer, a glass substrate layer, a rear conductive shield layer, an optically clear adhesive layer, and/or the like. The layers of the touch screen 1030 may surround the light source 1010 and the camera 1015 such that the touch screen 1030 senses touch in the areas adjacent to the light source 1010 and the camera 1015. In some embodiments, the touch screen 1030 can also sense touch at an area in which the light source 1010 and/or the camera 1015 are located (e.g., if the light source 1010 and/or the camera 1015 are located below the cover 1040 and below the various layers of the touch screen 1030). The location of the light source 1010 and/or the camera 1015 may or may not be designated on the cover 1040 so as to notify the user where to place his or her appendage when taking a vein or artery structure reading. As described above, during authentication, the user interface displayed on the touch screen 1030 may prompt the user to place an appendage, such as the finger 1020, a short distance (e.g., a distance sufficient to allow the appendage to be illuminated in a manner that causes the vein or artery structure to become visible, such as an inch) above the cover 1040 where the camera 1015 is located so that an image of the vein or artery structure can be captured. In some embodiments, if the distance between the cover 1040 and the camera 1015 is equivalent to the short distance, then the touch screen 1030 may indicate that the user can place the appendage directly on the cover 1040 of the touch screen 1030.

In each of the embodiments described herein with respect to FIGS. 10A-10D, the light source 1010 and the camera 1015 can be placed adjacent to each other and located on the same side relative to a user's appendage. With the light source 1010 and the camera 1015 facing the same direction (e.g., the orientation of the output of the light source 1010 and the direction in which the camera 1015 is oriented to capture an image are in the same direction), the user does not have to insert an appendage into an enclosed or partially enclosed structure). Rather, the area available for capturing the vein structure can be open, allowing for any size appendage to be scanned.

Example Process for Authenticating a User

Figure 11:
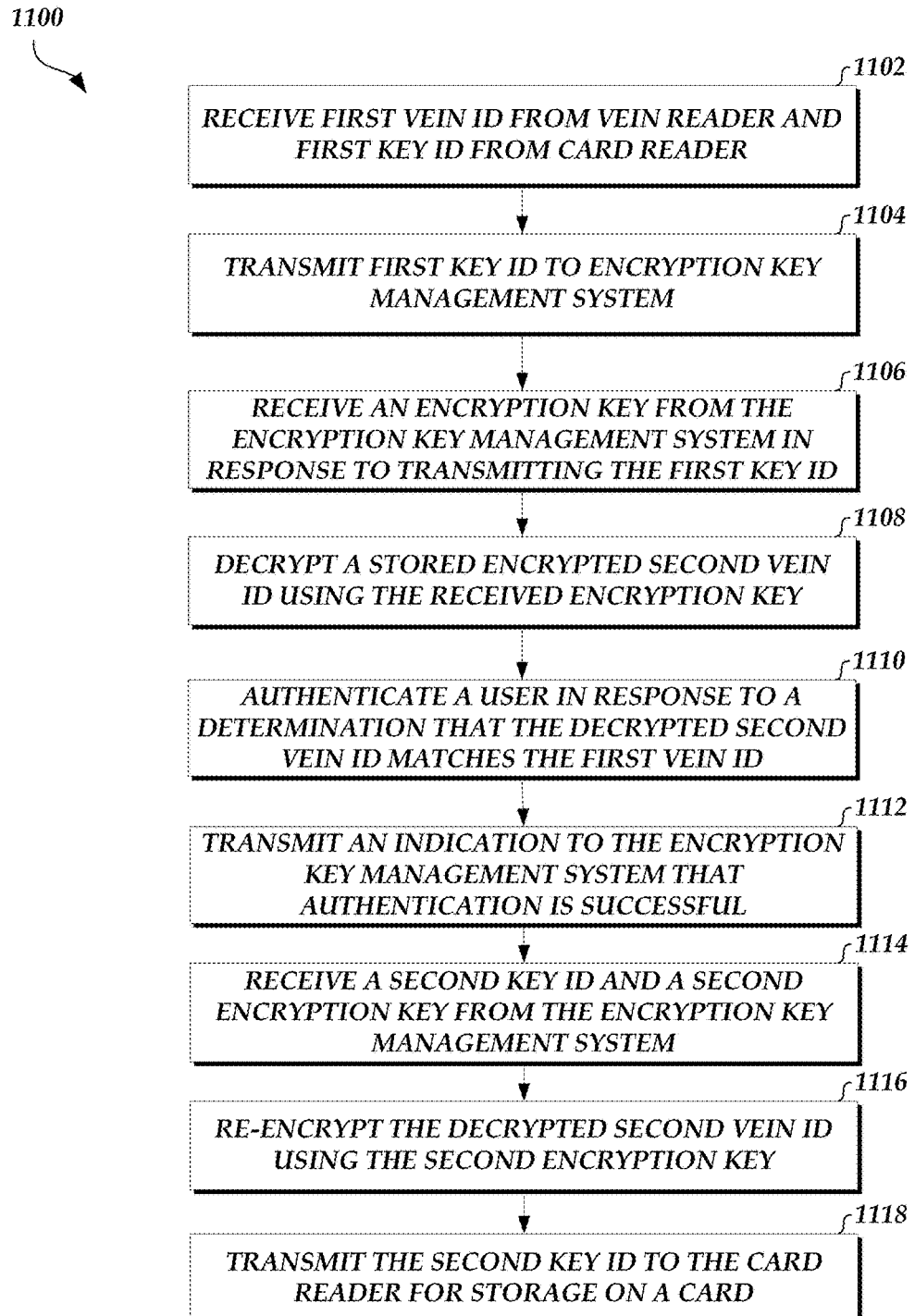
FIG. 11 illustrates a process that may be implemented by the one or more monitoring servers of FIGS. 2A-2B to authenticate a user.

FIG. 11 illustrates a process 1100 that may be implemented by the one or more monitoring servers 207 (e.g., the LDAP server) to authenticate a user. The process 1100 begins at block 1102.

At block 1102, a first vein ID is received from a vein reader (via an electronic device, such as the electronic device 711A) and a first key ID is received from a card reader (via an electronic device, such as the electronic device 711A). The first vein ID may be an alphanumeric representation of a vein or artery structure present in a user's appendage. The first key ID may reference a key (e.g., an encryption key) used to encrypt authentication data stored in the LDAP server. In a further embodiment, information associated with other authentication factors are also received, such as a username/password combination, a single-use code, behavioral data, and/or the like.

At block 1104, the first key ID is transmitted to an encryption key management system, such as the encryption key management system 205. The first key ID can be transmitted to the encryption key management system 205 for the purpose of receiving an encryption key associated with the first key ID.

At block 1106, an encryption key is received from the encryption key management system in response to transmitting the first key ID. In an embodiment, the EKMS 501 in the encryption key management system 205 uses the first key ID to identify the encryption key and transmits the encryption key to the LDAP server.

At block 1108, a stored encrypted second vein ID is decrypted using the received encryption key. In a further embodiment, a stored encrypted username/password combination, a stored encrypted single-use code, and/or stored encrypted behavioral data are also decrypted using the received encryption key.

At block 1110, a user is authenticated in response to a determination that the decrypted second vein ID matches the first vein ID. In further embodiments, the user is also authenticated in response to a determination that the decrypted second vein ID closely matches the first vein ID (e.g., the first vein ID has a last character of "5" and the decrypted second vein ID has a last character of "4").

At block 1112, an indication that authentication is successful is transmitted to the encryption key management system. The indication may be transmitted so that the encryption key management system can begin a key rotation process such that the authentication data is re-encrypted with a new key.

At block 1114, a second key ID and a second encryption key are received from the encryption key management system. In an embodiment, the second key ID references the second encryption key.

At block 1116, the decrypted second vein ID is re-encrypted using the second encryption key. In a further embodiment, the decrypted username/password combination, the decrypted single-use code, and/or the decrypted behavioral data are also re-encrypted using the second encryption key.

At block 1118, the second key ID is transmitted to the card reader for storage on a card (e.g., a tag or storage device). In an embodiment, the card reader replaces the first key ID initially stored on the card with the second key ID.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for authenticating a user comprising:
an encryption key management system configured to store a plurality of encryption keys; and
a monitoring server coupled to the encryption key management system, the monitoring server configured with specific computer-executable instructions to at least:
receive a first vein ID and a first key ID from a user device, wherein the first key ID references a first encryption key stored in the encryption key management system, receive a username and password combination from a second user device, receive behavioral data captured by the second user device as the user enters the username and password combination, transmit the first key ID to the encryption key management system, receive the first encryption key from the encryption key management system, retrieve an encrypted second vein ID, decrypt the encrypted second vein ID using the first encryption key to generate a decrypted second vein ID, authenticate a user associated with the user device at least partly by determining that the decrypted second vein ID matches the first vein ID, that the received username and password combination matches a stored username and password combination, and that the received behavioral data matches stored behavioral data, transmit an indication to the encryption key management system that the user is authenticated, receive a second key ID and a second encryption key from the encryption key management system, wherein the second key ID references the second encryption key, re-encrypt the decrypted second vein ID using the second encryption key, and transmit the re-encrypted second key ID to the user device for storage on a storage device.

2. The system of claim 1, in combination with the user device, wherein the user device comprises a camera configured to capture an image of a structure of a vein in an appendage of a user such that the image can be converted into the first vein ID.

3. The system of claim 2, wherein the user device is configured to erase the structure of the vein from memory after the user is authenticated.

4. The system of claim 1, wherein a vein reader is coupled to the user device, and wherein the vein reader is configured to capture an image of a structure of a vein in an appendage of a user such that the image can be mapped to the first vein ID.

5. A computer-implemented method for authenticating a user, the computer-implemented comprising:

as implemented by one or more computing devices configured with specific computer-executable instructions, receiving a first vein ID and a first key ID from a user device, wherein the first key ID references a first encryption key stored in an encryption key management system;

receiving a username and password combination from a second user device;

receiving behavioral data captured by the second user device as the user enters the username and password combination;

transmitting the first key ID to the encryption key management system;

receiving the first encryption key from the encryption key management system;

retrieving an encrypted second vein ID;

decrypting the encrypted second vein ID using the first encryption key to generate a decrypted second vein ID;

authenticating a user associated with the user device at least partly by determining that the decrypted second vein ID matches the first vein ID, that the received username and password combination matches the stored username and password combination, and that the received behavioral data matches stored behavioral data;

transmitting an indication to the encryption key management system that the user is authenticated;

receiving a second key ID and a second encryption key from the encryption key management system, wherein the second key ID references the second encryption key;

re-encrypting the decrypted second vein ID using the second encryption key; and transmitting the re-encrypted second key ID to the user device for storage on a storage device.

6. The computer-implemented method of claim 5, in combination with the user device, wherein the user device comprises a camera configured to capture an image of a structure of a vein in an appendage of a user such that the image can be converted into the first vein ID.

7. The computer-implemented method of claim 6, wherein the user device is configured to erase the structure of the vein from memory after the user is authenticated.

8. The computer-implemented method of claim 5, wherein a vein reader is coupled to the user device, and wherein the vein reader is configured to capture an image of a structure of a vein in an appendage of a user such that the image can be mapped to the first vein ID.

9. Non-transitory, computer-readable storage media comprising computer-executable instructions for authenticating a user, wherein the computer-executable instructions, when executed by a computer system, cause the computer system to:

receive a first vein ID and a first key ID from a user device, wherein the first key ID references a first encryption key stored in an encryption key management system;

receive a username and password combination from a second user device;

receive behavioral data captured by the second user device as the user enters the username and password combination;

transmit the first key ID to the encryption key management system;

receive the first encryption key from the encryption key management system;

retrieve an encrypted second vein ID;

decrypt the encrypted second vein ID using the first encryption key to generate a decrypted second vein ID;

authenticate a user associated with the user device at least partly by determining that the decrypted second vein ID matches the first vein ID, that the received username and password combination matches a stored username and password combination, and that the received behavioral data matches stored behavioral data;

transmit an indication to the encryption key management system that the user is authenticated;

receive a second key ID and a second encryption key from the encryption key management system, wherein the second key ID references the second encryption key;

re-encrypt the decrypted second vein ID using the second encryption key; and transmit the re-encrypted second key ID to the user device for storage on a storage device.

10. The non-transitory, computer-readable storage media of claim 9, in combination with the user device, wherein the user device comprises a camera configured to capture an image of a structure of a vein in an appendage of a user such that the image can be converted into the first vein ID.

11. The non-transitory, computer-readable storage media of claim 10, wherein the user device is configured to erase the structure of the vein from memory after the user is authenticated.

12. The non-transitory, computer-readable storage media of claim 9, wherein a vein reader is coupled to the user device, and wherein the vein reader is configured to capture an image of a structure of a vein in an appendage of a user such that the image can be mapped to the first vein ID.

* * * * *